(12) United States Patent
Johnson et al.

(10) Patent No.: US 11,132,554 B2
(45) Date of Patent: Sep. 28, 2021

(54) COUNTERFEIT DETECTION OF AN OPTICALLY ACTIVE ARTICLE USING SECURITY ELEMENTS

(71) Applicant: 3M INNOVATIVE PROPERTIES COMPANY, St. Paul, MN (US)

(72) Inventors: Justin M. Johnson, Hudson, WI (US); James W. Howard, Circle Pines, MN (US); James B. Snyder, Minneapolis, MN (US); Kui Chen-Ho, Woodbury, MN (US); Suman K. Patel, Woodbury, MN (US); Travis L. Potts, Woodbury, MN (US); Carla H. Barnes, St. Paul, MN (US); Tadesse G. Nigatu, Cottage Grove, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 122 days.

(21) Appl. No.: 16/097,652

(22) PCT Filed: May 12, 2017

(86) PCT No.: PCT/US2017/032340
§ 371 (c)(1),
(2) Date: Oct. 30, 2018

(87) PCT Pub. No.: WO2017/197223
PCT Pub. Date: Nov. 16, 2017

(65) Prior Publication Data
US 2019/0163980 A1 May 30, 2019

Related U.S. Application Data

(60) Provisional application No. 62/336,340, filed on May 13, 2016.

(51) Int. Cl.
*G06K 9/00* (2006.01)
*B60R 25/01* (2013.01)
(Continued)

(52) U.S. Cl.
CPC .......... *G06K 9/00744* (2013.01); *B60R 25/01* (2013.01); *G06K 9/3258* (2013.01);
(Continued)

(58) Field of Classification Search
CPC ........ B65H 2511/40; B65H 2701/1928; G06Q 20/341; G06K 2209/15; G06K 9/325; G06K 19/0614
See application file for complete search history.

(56) References Cited

U.S. PATENT DOCUMENTS 4,368,979 A    1/1983 Ruell
4,581,325 A    4/1986 Kitchin
(Continued)

FOREIGN PATENT DOCUMENTS

EP    0416742    3/1991
GB    02458701    9/2009
(Continued)

OTHER PUBLICATIONS

Holliman, "Counterfeiting attacks on oblivious block-wise independent invisible watermarking schemes", Image Processing, IEEE Transactions, Mar. 2000, vol. 9, No. 3, pp. 432-441.
(Continued)

*Primary Examiner* — Dung Hong
(74) *Attorney, Agent, or Firm* — Michael Stem

(57) ABSTRACT

In some examples, an optically active article includes a retroreflective substrate; and at least one security element disposed at the retroreflective substrate; an article message disposed at the retroreflective substrate, and wherein the at least one security element comprises validation information
(Continued)

that is detectable outside a visible light spectrum, and wherein a combination of the article message and the validation information of the at least one security element indicates whether the optically active article is counterfeit.

18 Claims, 10 Drawing Sheets

(51) Int. Cl.
*G08G 1/017* (2006.01)
*G06K 9/32* (2006.01)
*G09F 3/02* (2006.01)

(52) U.S. Cl.
CPC ....... *G08G 1/0175* (2013.01); *G06K 2209/15* (2013.01); *G09F 2003/0276* (2013.01)

(56) References Cited

U.S. PATENT DOCUMENTS

| | | | |
|---|---|---|---|
| 4,688,894 A | 8/1987 | Hockert | |
| 4,691,993 A | 9/1987 | Porter | |
| 4,908,500 A | 3/1990 | Baumberger | |
| 6,288,842 B1 | 9/2001 | Florczak | |
| 6,465,787 B1* | 10/2002 | Coulter | G02B 27/28 250/341.3 |
| 6,677,030 B2 | 1/2004 | Thakker | |
| 6,832,728 B2 | 12/2004 | Kennedy | |
| 7,068,434 B2 | 6/2006 | Florczak | |
| 7,387,393 B2 | 6/2008 | Reich | |
| 7,422,334 B2 | 9/2008 | Smith | |
| 7,611,251 B2 | 11/2009 | Thakker | |
| 8,865,293 B2 | 10/2014 | Smithson | |
| 8,950,877 B2 | 2/2015 | Northey | |
| 9,002,066 B2 | 4/2015 | Kozitsky | |
| 9,025,828 B2 | 5/2015 | Karel | |
| 2002/0030112 A1 | 3/2002 | Schreiber | |
| 2004/0075869 A1* | 4/2004 | Hilton | G06Q 20/042 358/3.28 |
| 2004/0089727 A1 | 5/2004 | Baharav | |
| 2008/0000976 A1* | 1/2008 | Thomas | G06K 7/10 235/454 |
| 2010/0151213 A1* | 6/2010 | Smithson | G02B 5/128 428/195.1 |
| 2011/0042462 A1* | 2/2011 | Smith | G08G 1/04 235/462.11 |
| 2011/0084126 A1 | 4/2011 | Fleming | |
| 2012/0195470 A1* | 8/2012 | Fleming | G06K 9/18 382/103 |
| 2012/0281285 A1 | 11/2012 | Orensteen | |
| 2013/0034682 A1 | 2/2013 | Free | |
| 2013/0114142 A1 | 5/2013 | Free | |
| 2013/0235203 A1* | 9/2013 | Billington | G08G 1/0175 348/148 |
| 2014/0046800 A1* | 2/2014 | Chen | G06Q 30/0623 705/26.61 |
| 2014/0078587 A1 | 3/2014 | Orensteen | |
| 2014/0131990 A1* | 5/2014 | Zolotukhin | B42D 25/41 283/86 |
| 2014/0160283 A1* | 6/2014 | Hofman | G06K 9/209 348/143 |
| 2014/0301606 A1* | 10/2014 | Paul | G06K 9/3258 382/105 |
| 2014/0368902 A1 | 12/2014 | Patel | |
| 2015/0043074 A1 | 2/2015 | Patel | |
| 2015/0049914 A1* | 2/2015 | Alves | G06K 9/033 382/105 |
| 2015/0060551 A1* | 3/2015 | Fleming | G06K 19/06103 235/462.42 |
| 2016/0027042 A1 | 1/2016 | Heeter | |
| 2016/0203379 A1* | 7/2016 | Hakim | G06K 9/3258 382/105 |
| 2016/0358033 A1* | 12/2016 | Herrera | G06K 9/6821 |
| 2018/0239981 A1* | 8/2018 | Johnson | G06K 9/2018 |

FOREIGN PATENT DOCUMENTS

| | | |
|---|---|---|
| WO | WO 1991-010213 | 7/1991 |
| WO | WO 2007-139035 | 12/2007 |
| WO | WO 2008-005724 | 1/2008 |
| WO | WO 2009-110213 | 9/2009 |
| WO | WO 2011-044149 | 4/2011 |
| WO | WO 2011-129832 | 10/2011 |
| WO | WO 2013-043827 | 3/2013 |
| WO | WO 2013-044000 | 3/2013 |
| WO | WO 2013-149142 | 10/2013 |
| WO | WO 2015-024070 | 2/2015 |
| WO | WO-2015024070 A1 * | 2/2015 ........... G06K 19/086 |
| WO | WO 2015-148426 | 10/2015 |
| WO | WO 2017-034938 | 3/2017 |
| WO | WO 2017-034968 | 3/2017 |
| WO | WO 2017-151202 | 9/2017 |

OTHER PUBLICATIONS

Zeng, "A statistical watermark detection technique without using original images for resolving rightful ownerships of digital images", Image Processing, IEEE Transactions, Nov. 1999, vol. 8, No. 11, pp. 1534-1548.
International Search report for PCT International Application No. PCT/US2017/032340 dated Sep. 11, 2017, 7 pages.

* cited by examiner

COUNTERFEIT DETECTION OF AN OPTICALLY ACTIVE ARTICLE USING SECURITY ELEMENTS

TECHNICAL FIELD

The present application relates generally to retroreflective articles and systems in which such retroreflective articles may be used.

BACKGROUND

Automatic Vehicle Recognition (AVR), A Number Plate Recognition (ANPR), or Automated License Plate Recognition (ALPR) may refer to the detection and recognition of a vehicle by an electronic system. Exemplary uses for AVR or ALPR include, for example, automatic tolling (e.g., electronic toll systems), traffic law enforcement (e.g., red light running systems, speed enforcement systems), searching for vehicles associated with crimes, access control systems, and facility access control. AVR systems in use today may include systems using RFID technology to read an RFID tag attached to a vehicle. ALPR systems may use cameras to capture images of license plates.

Some AVR systems use RFID, although not all vehicles may include RFID tags. Furthermore, some tag readers may have difficulty pinpointing the exact location of an unpowered RFID tag. As such, these tag readers may only detect the presence or absence of a tag in their field of sensitivity, rather than information included in the RFID tags. Some RFID tag readers may only operate at short range, function poorly in the presence of metal, and/or may be blocked by interference when many tagged objects are present.

ALPR systems use an image capture device to read information of a vehicle, such as a license plate number or other visual content of the license plate. In some instances, the information is attached to, printed on, or adjacent to a license plate. ALPR systems may be used in many environments, since almost all areas of the world require that vehicles have license plates with visually identifiable information thereon. However, image capture and recognition of license plate information for a vehicle may be complex. For example, the read accuracy from an ALPR system may be dependent on the quality of the captured image as assessed by the reader. Moreover, counterfeiters may seek to create counterfeit versions of license plates.

DETAILED DESCRIPTION

Techniques and articles described in this disclosure generally relate incorporating security elements into an optically active article, such that a combination of the security elements and article message printed on the article indicate whether the article is a counterfeit. For instance, the optically active article may include visually apparent information printed as an article message, such as license plate number. The optically active article may also include one or more security elements comprising visually transparent information that is apparent outside the visible light spectrum, such as IR visible light. Validation information represented or contained in the security elements correspond to the article message, such that the combination of the article message and security elements indicate whether the optically active article is counterfeit or authentic. In some examples, by exposing the optically active article to light outside the visible spectrum, validation information may be determined by a computing device from the security elements and used in combination with the article message itself to determine whether the optically active article is counterfeit or authentic. For instance, the validation information represented by the security elements may correspond to the result of generated by applying a one-way function to the article message.

In some examples, both the article message and security elements are machine readable, for example by a camera. Therefore, utilizing retroreflective substrates can give high contrast for both the article message and security elements in both the visible light spectrum and outside the visible light spectrum. Any common retroreflective sheeting materials could be used, such as, for example, beaded or prismatic sheeting.

For the visually transparent information (e.g., validation information represented by or contained in the security elements), typically that is a colored image of a high contrast color as compared to the background. In addition, the coloring at the visually transparent information may not allow for substantial amounts of light to return to the light source. Therefore, in both diffuse (daylight) and from a light source providing with the sheet providing retroreflection, there is high contrast.

In some examples, for the visually transparent information, a number of techniques could be used so long as the information is not apparent under visible light conditions, but is apparent under light conditions outside the visible light spectrum. For example, visibly transparent but IR absorbing inks or visibly transparent but IR reflecting film could be used. For example, reducing or eliminating the retroreflective function of portions of the retroreflective sheeting. Any number of techniques could be used within the body of the retroreflective sheeting or as a separate layer in combination with the retroreflective sheeting.

Figure 1:
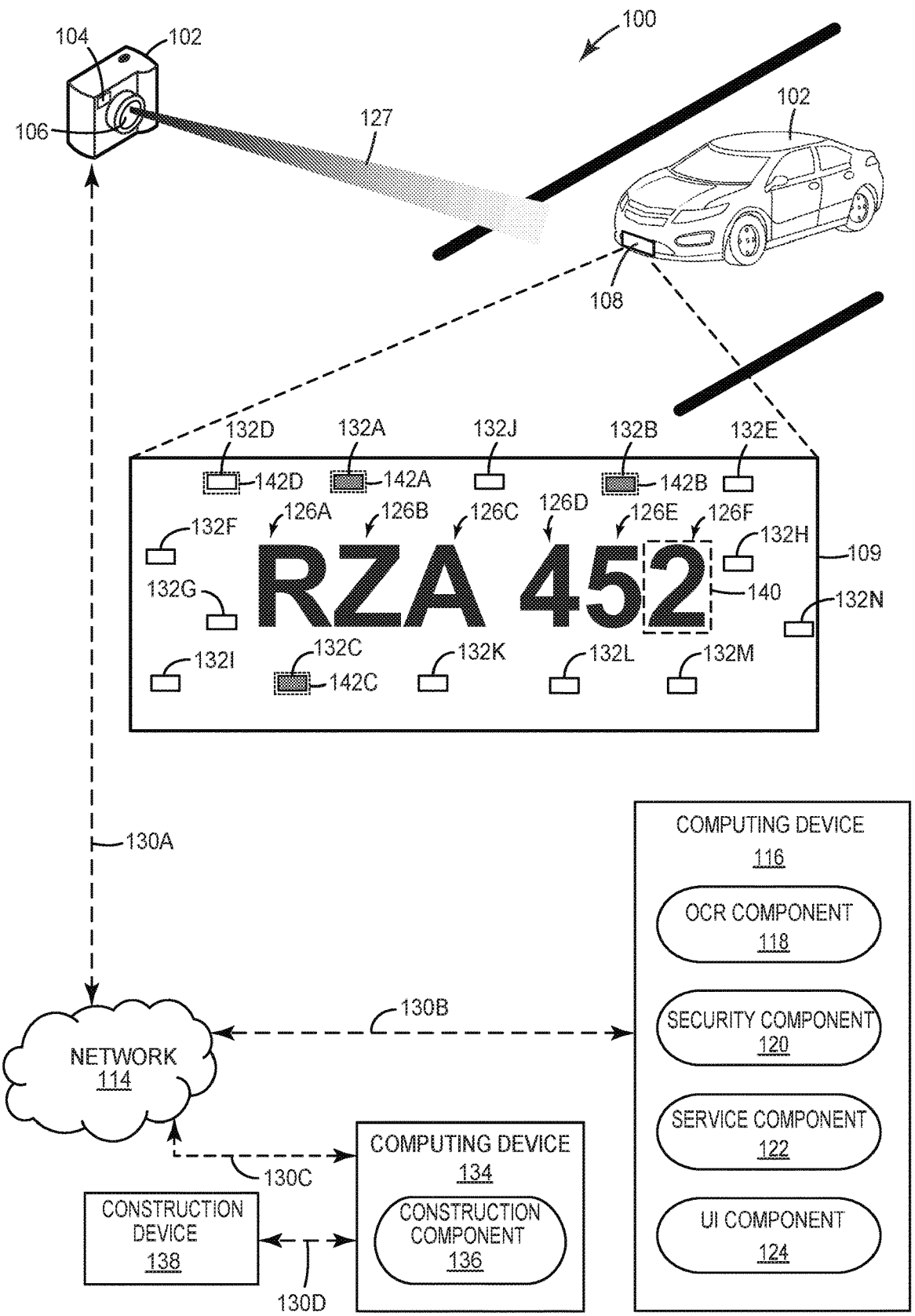
FIG. 1 is a block diagram illustrating an example system for detecting counterfeit optically active articles, in accordance with techniques of this disclosure.

FIG. 1 is a block diagram illustrating an example system 100 for detecting whether an optically active article 108 is counterfeit, in accordance with techniques of this disclosure. As shown in FIG. 1, system 100 includes an image capture device 102. Image capture device 102 may include one or more image capture sensors 106 and one or more light sources 104. System 110 may also include one or more optically active articles as described in this disclosure, such as license plate 108. License plate 108 may be attached or otherwise associated with vehicle 110. In some examples, image capture device 102 is communicatively coupled to computing device 116 via network 114 using one or more communication links. In other examples, as described in this disclosure, image capture device 102 may be communicatively coupled to computing device 102 via one or more forms of direct communication without network 114, such as via a wired or wireless connection that does not require a network.

As shown in FIG. 1, system 100 may include image capture device 102. Image capture device 102 may convert light or electromagnetic radiation sensed by image capture sensors 106 into information, such as digital image or bitmap comprising a set of pixels. Each pixel may have chromiance and/or luminance components that represent the intensity and/or color of light or electromagnetic radiation. In some examples, a first set of pixel values, which represent one or more active encoding regions of the one or more encoding regions, are within a first range of pixel values, a second set of pixel values, which represent a remaining portion of the at least one symbol that excludes the one or more active encoding regions, are within a second range of pixel values that are different from the first range of pixel values. In some examples, the image is a first image and wherein the first image of the optically active article is captured in a first spectral range within the near-infrared spectrum, a second image of the optically active article is captured in a second spectral range within the visible spectrum, a third set of pixel values that represent the at least one symbol in the second image are within the second range of pixel values, and a first proportion of the third set of pixel values that represent the at least one symbol is greater than a second proportion of the second set of pixel values that represent the at least one symbol.

Image capture device 102 may include one or more image capture sensors 106 and one or more light sources 104. In some examples, image capture device 102 may include image capture sensors 106 and light sources 104 in a single integrated device, such as shown in FIG. 1. In other examples, image capture sensors 106 or light sources 104 may be separate from or otherwise not integrated in image capture device 102. Examples of image capture sensors 106 may include semiconductor charge-coupled devices (CCD) or active pixel sensors in complementary metal —oxide-semiconductor (CMOS) or N-type metal-oxide-semiconductor (NMOS, Live MOS) technologies. Digital sensors include flat panel detectors. In the example, image capture device 102 includes at least two different sensors for detecting light in two different wavelength spectrums. In some embodiments, a first image capture and a second image capture sensor substantially concurrently detect the first and second wavelengths. Substantially concurrently may refer to detecting the first and second wavelengths within 10 milliseconds of one another, within 50 milliseconds of one another, or within 100 milliseconds of one another to name only a few examples.

In some examples, one or more light sources 104 include a first source of radiation and a second source of radiation. In some embodiments, the first source of radiation emits radiation in the visible spectrum, and the second source of radiation emits radiation in the near infrared spectrum. In other embodiments, the first source of radiation and the second source of radiation emit radiation in the near infrared spectrum. As shown in FIG. 1 one or more light sources 104 may emit radiation (e.g., infrared light 127) in the near infrared spectrum.

In some examples, image capture device 102 includes a first lens and a second lens. In some examples, image capture device 102 captures frames at 50 frames per second (fps). Other exemplary frame capture rates include 60, 30 and 25 fps. It should be apparent to a skilled artisan that frame capture rates are dependent on application and different rates may be used, such as, for example, 100 or 200 fps. Factors that affect required frame rate are, for example, application (e.g., parking vs, tolling), vertical field of view (e.g., lower frame rates can be used for larger fields of view, but depth of focus can be a problem), and vehicle speed (faster traffic requires a higher frame rate).

In some examples, image capture device 102 includes at least two channels. The channels may be optical channels. The two optical channels may pass through one lens onto a single sensor. In some examples, image capture device 102 includes at least one sensor, one lens and one band pass filter per channel. The band pass filter permits the transmission of multiple near infrared wavelengths to be received by the single sensor. The at least two channels may be differentiated by one of the following: (a) width of band (e.g., narrowband or wideband, wherein narrowband illumination may be any wavelength from the visible into the near infrared); (b) different wavelengths (e.g., narrowband processing at different wavelengths can be used to enhance features of interest, such as, for example, a license plate and its lettering (license plate identifier), while suppressing other features (e.g., other objects, sunlight, headlights); (c) wavelength region (e.g., broadband light in the visible spectrum and used with either color or monochrome sensors); (d) sensor type or characteristics; (e) time exposure; and (f) optical components (e.g., lensing).

In the example of FIG. 1, image capture device 102 may be stationary or otherwise mounted in a fixed position and the position of optically active article 108 may not be stationary. Image capture device 102 may capture one or more images of optically active article 108 as vehicle 110 approaches or passes by image capture device 102. In other examples, however, image capture device 102 may be not be stationary. For instance, image capture device 102 may be in another vehicle or moving object. In some examples, image capture device 102 may be held by a human operator or robotic device, which changes the position of image capture device 102 relative to optically active article 108.

In the example of FIG. 1, image capture device 102 may be communicatively coupled to computing device 116 by one or more communication links 130A and 130B. Image capture device 102 may send images of optically active article 108 to computing device 116. Communication links 130A and 130B may represent wired or wireless connections. For instance communication links 130A and 130B may be wireless Ethernet connections using a WiFi protocol and/or may be wired Ethernet connections using Category 5 or Category 6 cable. Any suitable communication links are possible. In some examples, image capture device 102 is communicatively coupled to computing device 116 by a network 114. Network 114 may represent any number of one or more network connected devices including by not limited to routers, switches, hubs, and interconnecting communication links that provide for forwarding of packet and/or frame-based data. For instance, network 114 may represent the Internet, a service provider network, a customer network, or any other suitable network. In other examples, image capture device 102 is communicatively coupled to computing device 116 by a direct connection, such as Universal Serial Bus (USB) link.

Computing device 116 represents any suitable computing system, which may be remote from image capture device 102, such as one or more desktop computers, laptop computers, mainframes, servers, cloud computing systems, etc. capable of sending and receiving information with image capture device 102. In some examples, computing device 116 implements techniques of this disclosure. For instance, techniques of this disclosure provide for detecting whether an optically active article is counterfeit based on a combination of security elements and an article message. For instance, a motor vehicle government organization may generate license plates as optically active articles with security elements, in accordance with techniques of this disclosure. Such a license plate may be attached to a vehicle and later read by image capture device 102 while the vehicle is operating on the highway. Using techniques of this disclosure computing device 116 may determine whether the license plate is counterfeit.

In the example of FIG. 1, computing device 116 includes an optical character recognition component 118 (or "OCR module 118), security component 120, service component 122 and user interface (UI) component 124. Components 118, 120, 122, and 124 may perform operations described herein using software, hardware, firmware, or a mixture of both hardware, software, and firmware residing in and executing on computing device 116 and/or at one or more other remote computing devices. In some examples, components 118, 120, 122 may be implemented as hardware, software, and/or a combination of hardware and software. Computing device 116 may execute components 118, 120, 122 with one or more processors. Computing device 116 may execute any of components 118, 120, 122 as or within a virtual machine executing on underlying hardware. Components 118, 120, 122 may be implemented in various ways. For example, any of components 118, 120, 122 may be implemented as a downloadable or pre-installed application or "app." In another example, any of components 118, 120, 122 may be implemented as part of an operating system of computing device 116.

For example purposes in FIG. 1, optically active article 108 is illustrated as a license plate as attached to vehicle 110. Vehicle 110 may be an automobile, motorcycle, airplane, water vessel, military equipment, bicycle, train, or any other transportation vehicle. In other examples, optically active article 108 may be attached to, included or embedded in, or otherwise comprise: a document, clothing, wearable equipment, a building, stationary equipment, or any other object to name only a few examples. In some examples, optically active article 108 may not be a separate object attached to vehicle 110 but rather printed on vehicle 110 or other suitable object.

In the example of FIG. 1, optically active article 108 may include reflective, non-reflective, and/or retroreflective sheet applied to a base surface. In some examples, an optically active article may be a retroreflective article. An article message, such as but not limited to characters, images, and/or any other information, may be printed, formed, or otherwise embodied on the optically active article 108. The reflective, non-reflective, and/or retroreflective sheet may be applied to a base surface using one or more techniques and/or materials including but not limited to: mechanical bonding, thermal bonding, chemical bonding, or any other suitable technique for attaching retroreflective sheet to a base surface. A base surface may include any surface of an object (such as described above, e.g., an aluminum plate) to which the reflective, non-reflective, and/or retroreflective sheet may be attached. An article message may be printed, formed, or otherwise embodied on the sheeting using any one or more of an ink, a dye, a thermal transfer ribbon, a colorant, a pigment, and/or an adhesive coated film. In some examples, content is formed from or includes a multi-layer optical film, a material including an optically active pigment or dye, or an optically active pigment or dye.

Optically active article 108 (e.g., a license place) in FIG. 1 includes article message 126A-126F ("article message 126"). In FIG. 1, each portion of article message 126 is a symbol from a symbol set. The symbol set may be an alphabet, number set, and/or any other set of glyphs. In FIG. 1, the symbol set includes at least the letters of Roman alphabet and Arabic numerals.

In accordance with techniques of this disclosure, optically active article 108 further includes one or more security elements, such as security elements 132A-132N. In some examples, a security element may be any content printed, formed, or otherwise embodied on optically active article 108 that facilitates the detection of counterfeit optically active articles using other content of the optically active article (e.g., "RZA 452"). As shown in FIG. 1, each of the plurality of security elements may be disposed in an array at the optically active article. Although security elements in FIG. 1 are described for illustration purposes as being formed by different areas that either retroreflect or do not retroreflect light, security elements in FIG. 1 may be printed, formed, or otherwise embodied in an optically active article using any light reflecting technique in which validation information may be determined from security elements. For instance, security elements may be printed using visibly-opaque, infrared-transparent ink and/or visibly-opaque, infrared-opaque ink as described in FIG. 6. Any suitable construction, in which security elements that are active or inactive are distinguishable under one or more lighting conditions, may be used in accordance with techniques and articles of this disclosure.

In FIG. 1, each security element of optically active article 108 may be printed using a flexographic printing process. For instance, optically active article 108 may include a base layer (e.g., an aluminum sheet), an adhesive layer disposed on the base layer, a structured surface disposed on the adhesive layer, and an overlay layer disposed on the structured surface such as described in U.S. Publication US2013/0034682, US2013/0114142, US2014/0368902, US2015/0043074, which are hereby expressly incorporated by reference in their entireties. The structured surface may be formed from optical elements, such as full cubes (e.g., hexagonal cubes or preferred geometry (PG) cubes), or truncated cubes, or beads as described in, for example, U.S. Pat. No. 7,422,334, which is hereby expressly incorporated by reference in its entirety.

To create security elements at different regions of the optically active article, a barrier material may be disposed at such different regions of the adhesive layer. The barrier material forms a physical "barrier" between the structured surface and the adhesive. By forming a barrier that prevents the adhesive from contacting a portion of the structured surface, a low refractive index area is created that provides for retroreflection of light off the optically active article back to a viewer. The low refractive index area enables total internal reflection of light such that the light that is incident on a structured surface adjacent to a low refractive index area is retroreflected. In this embodiment, the security elements are formed from portions of the barrier material.

In other embodiments, total internal reflection is enabled by the use of seal films which are attached to the structured surface of the optically active article by means of, for example, embossing. Exemplary seal films are disclosed in U.S. Patent Publication No. 2013/0114143, and U.S. Pat. No. 7,611,251, all of which are hereby expressly incorporated herein by reference in their entirety.

In yet other embodiments, a reflective layer is disposed adjacent to the structured surface of the optically active article, in addition to or in lieu of the seal film. Suitable reflective layers include, for example, a metallic coating that can be applied by known techniques such as vapor depositing or chemically depositing a metal such as aluminum, silver, or nickel. A primer layer may be applied to the backside of the cube-corner elements to promote the adherence of the metallic coating.

FIG. 1 illustrates an image 109 of optically active article 108 that is captured with light outside the visible light spectrum. For instance, in FIG. 1, the light may be infrared light 127. In some examples, a first spectral range is from about 350 nm to about 700 nm (i.e., visible light spectrum) and a second spectral range is from about 700 nm to about 1100 nm (i.e., near infrared spectrum). In some examples, a first spectral range is from about 700 nm to about 850 nm, and a second spectral range is between 860 nm to 1100 nm. Each of the security elements 132A-132C have not been printed with or otherwise do not include a barrier material as described above, while the remaining security elements (e.g., 132D) have been printed with the barrier material. As such, when image 109 is generated, the infrared light 127 is retroreflected from optical elements adjacent to security elements 132D-132N back to image capture device 102 because these optical elements adjacent to security elements 132D-132N correspond to portions of the structured surface having low refractive index areas. As a result of receiving the retroreflected light, security elements other than 132A-132C may appear white or bright relative to other content in image 109. By contrast, security elements 132A-132C do not include a barrier material and therefore do not retroreflect the infrared light with the same intensity as security elements 132D-132N. Accordingly, security elements 132A-132C appear black or darker than security elements 132D-132N in image 109.

In the example of FIG. 1, any number of security elements, such as security elements 132D-132N, may be include barrier materials, such that the entire area or substantially the entire area (e.g., greater than 50% of area) of the security element is comprised of the barrier material. Other security elements 132A-132C may not include any barrier material or substantially less than the entire area (e.g., less than 50% of area) or only a perimeter may include a barrier material. In some examples, security elements 132A-132N include ink compositions and are provided on optically active article 108 using flexographic printing. In addition to ink compositions, other exemplary suitable materials for forming barrier materials include at least one of coating compositions, films (e.g., polymeric), or additives that reduce or eliminate adhesion of the underlying adhesive layer. Furthermore, other techniques may also be used, such as needle die coating, gravure printing, ink jet printing, screen printing, thermal mass transfers printing, laser printing, or any other suitable printing technique.

In some examples, each of security elements 132 may be referred to as "active" or "inactive." Validation information may include a first value for an active security element, while validation information for an inactive security element may represent a second, different value. For instance, an active security element may represent a '1' in a bitstring as validation information, and an inactive security element may represent a '0' in a bitstring as validation information, or vice-versa. In another example an active security element may represent a Boolean value of true as validation information, while the inactive security element may represent a Boolean value of false as validation information, or vice-versa. In still other examples, active and inactive security elements may be mapped to any respective values as validation information. In some examples, a first security element may be "active" if the region corresponding to the first security element does not retroreflect light, while a second security element may be "inactive" if the region corresponding to second security element retroreflects light. In an alternative example, a first security element may be "active" if the region corresponding to the first security element retroreflects light, while a second security element may be "inactive" if the region corresponding to second security element does not retroreflect light.

As described in FIG. 1, image 109 may be captured under IR lighting. As such, security elements 132A-132C, which appear relatively darker or black, may be "active", while security elements 132D-132N appear relatively brighter or white may be "inactive". In other examples the converse is possible. In some examples, image 109 captured under IR lighting may not indicate boundaries of inactive security elements 132D-132N at all if IR light is retroreflected as in any other area of image 109 excluding security elements 132A-132C. That is, in some examples, the locations of inactive security elements 132D-132N in FIG. 1 may merely indicate the locations of possible security elements rather than include any different structure than other areas (excluding areas for security elements 132A-132C) of optically active article 108. For an image of optically active article 108 captured under visible lighting conditions, security elements 132A-132C may not appear black but rather as the color and/or brightness of an area of retroreflective sheeting without retroreflective elements, such as barrier material or other retroreflective structures described in this disclosure. For such an image of optically active article 108 captured under visible lighting conditions, security elements 132D-132N may appear as the color and/or brightness of an area of retroreflective sheeting with retroreflective elements, such as barrier material or other retroreflective structures described in this disclosure. In some examples, validation information may only be determinable from the security elements under a particular lighting condition. In some examples, the particular lighting condition may be outside the visible light spectrum. In some examples, the particular lighting condition may be within the visible light spectrum.

Techniques of this disclosure provide for the detection of counterfeit optically active articles based on validating article message 126 with security features 132 (or vice versa). To initially manufacture or otherwise create optically active article 108 with security elements 132A-132N and article message 126A-126F, construction device 138 may be used in conjunction with computing device 134, which controls the operation of construction device 138. In some examples, construction device 138 may be any device that prints, disposes, or otherwise forms security elements 132A-132N and article message 126A-126F on optically active article 108. Examples of construction device 138 include but are not limited to a needle die, gravure printer, screen printer, thermal mass transfer printer, laser printer/engraver, laminator, flexographic printer, an ink jet printer, an infrared-ink printer. In some examples, optically active article 108 may be the retroreflective sheeting constructed by construction device 138, and a separate construction process or device, which is operated in some cases by a different operators or entities than computing device 138, may apply the article message to the sheeting and/or the sheeting to the base layer (e.g., aluminum plate).

Construction device 138 may be communicatively coupled to computing device 134 by communication link 130D. Computing device 134 may control the operation of construction device 138. For instance, computing device 134 may include one or more printing specifications. A printing specification may comprise data that defines properties (e.g., location, shape, size, pattern, composition or other spatial characteristics) of article message 126 and security elements 132 on optically active article 108. In some examples, the printing specification may be generated by a human operator or by a machine. In any case, construction component 136 may send data to construction device 138 that causes construction device 138 to print an article message and security elements in accordance with the printer specification. In some examples, a printer specification may include a set of license plate numbers.

A printer specification may also include or otherwise specify one or more validation functions and/or validation configurations, as further described in this disclosure. To provide for counterfeit detection, construction component 136 may print security elements and article message in accordance with validation functions and/or validation configurations that are also implemented in security component 120. A validation function may be any function that takes as input, validation information (e.g., an encoded or literal value(s) of one or more of the article message and/or security elements of an optically active article), and produces a value as output that can be used to verify whether the combination of the article message and security elements indicate an optically active article is authentic or counterfeit. Examples of validation functions may include one-way functions, mapping functions, or any other suitable functions. A validation configuration may be any mapping of data or set of rules that represents a valid association between validation information of the one or more security elements and the article message, and which can be used to verify whether the combination of the article message and validation information indicate an optically active article is authentic or counterfeit. As further described in this disclosure, security component 120 may determine whether the validation information satisfies one or more rules of a validation configuration that was used to generate the construct the optically active article with the article message and the at least one security element, wherein the one or more rules of the validation configuration define a valid association between the article message and the validation information of the one or more security elements.

In the example of FIG. 1, each of security elements 132A-132N may correspond to a different bit position in an encoded bit string that represents whether each of security elements 132A-132N are active or inactive. For instance, security component 120 may generate a bit string from image 109 equal to 00010000001010, where the high to low order bits correspond in order to 132M, 132L, 132K, 132C, 132I, 132N, 132G, 132H, 132F, 132E, 132B, 132J, 132A, 132D. The bits equal to '1' correspond to security elements 132A, 132B, and 132C. In some examples the bitstring may be validation information.

Construction device 138 may print security elements 132 in accordance with a set of validation configurations. For instance one of the validation configurations may comprise a rule that requires the symbol of the least significant symbol position of the article message to be an integer value of '2' if only security elements 132A, 132B and 132C are active. In examples, the least significant symbol position may be the right-most symbol of a string and the most-significant symbol position may be the left-most symbol. In the example of FIG. 1, only security elements 132A, 132B, and 132C are active because these security elements are constructed so as not to be retroreflective. In the example of FIG. 1, the least significant symbol position of the article message (e.g., the position with the number '2') may be a decimal integer value of 0-9. The respective validation configurations may specify that each respective decimal value in the least significant symbol position must correspond to a different set of active security elements. For instance, in an authentic optically active article, a validation configuration may specify that only security elements 132B and 132F are active if the least significant symbol position of the article message is an integer value of '3'. Security component 120 may validate, using a validation function, and based on the different validation configurations, that only security elements 132B and 132F are active for an optically active article with a '3' in the least significant symbol position. In this way, security component 120 may detect a counterfeit optically active article with a '3' in the least significant symbol position that does not include only security elements 132B and 132F as active security elements.

In the example of FIG. 1, construction component 136 may cause construction device 138 to print security elements 132 and article message 126 on optically active article 108 in accordance with the validation configurations as described above. Optically active article 108 may be attached to vehicle 110 as shown in FIG. 1. Vehicle 110 may be driving on a roadway and approach image capture device 102. Image capture device 102 may cause light source 104 to project infrared light 127 in the direction of vehicle 110. At substantially the same time as light source 104 is projecting infrared light 127, image capture device 102 may capture one or more images of optically active article 108, such as image 109. Substantially the same time may be at the same time or within 10 milliseconds, 50, milliseconds, or 100 milliseconds. Image 109 may be a bitmap in which active security elements appear as black pixels and inactive security elements appear as white pixels. The resulting image 109 may be stored as a bitmap, which image capture device 102 sends to computing device 116 (or "counterfeit article detection device 116") via network 114.

In the example of FIG. 1, OCR component 118 initially receives the bitmap representing image 109. As shown in FIG. 1, image 109 includes at least one symbol (e.g., a '2') in article message 126. In response to receiving image 109, OCR component 118 performs optical character recognition on an image region 140 that includes symbol '2' of article message 126F. Based on OCR component 118 performing optical character recognition, OCR component 118 determines that image region 140 of image 109 represents the at least one symbol '2'. OCR component 118 may further determine that other image regions correspond to the characters 'R', 'Z', 'A', '4', and '5'. OCR component 118 may implement any one or more OCR techniques including but not limited to matrix matching and feature matching. Matrix matching may perform pixel-by-pixel comparison of one or more portions of image region 140 to a set of one or more stored glyphs, one of which corresponds to the symbol '2'. Feature matching decomposes various features (e.g., lines, loops, line direction, intersections, etc.) of article message 126F, which are compared to glyph features of a set of corresponding symbols to identify the symbol '2'.

Security component 120 may receive data that indicates the symbols 'R', 'Z', 'A', '4', '5', and '2'. Security component 120 may identify or otherwise determine validation information one or more security elements represented in image 109. For instance, security component 120 may store security data that indicates the respective locations or regions of image 109 that includes security elements 132. Security component 120 may determine whether each respective location or region of image 109 that corresponds to a security element, actually includes the security element or includes a particular value for the security element. Validation information may be set of values, such as a bitstring, representing whether the location of each security element is active or inactive.

In FIG. 1, security component 120 may determine whether image region 142A includes an active or inactive security element. Security component 120 may inspect similar image regions 142B and 142C to determine whether security elements within the image regions are active or inactive. Security data (as further illustrated in FIG. 2) of security component 120 may include one or more validation functions and/or one or more validation conditions on which the construction of optically active article 108 is based. For instance, security component 120 may include the validation condition that security elements 132A-132C must be active if the least significant symbol position of the article message is '2'. In the current example, security component 120 determines, using a validation function based on the validation condition and the validation information for the security elements, that security elements 132A-132C are active and the least significant symbol position of the article message is '2' in optically active article 108. Security component 120, based on determining that a combination of the validation information of the security elements and the article message satisfies the validation configuration, generates data that indicates optically active article 108 is authentic (e.g., not a counterfeit). If a combination of the validation information for the security elements 132A-132C and the least significant symbol position of the article message in optically active article 108 did not satisfy the validation criteria, security component 120 may generate data that indicates optically active article is not authentic (e.g., counterfeit).

Security component 120 may send the data that indicates whether optically active article 108 is authentic or counterfeit. Service component 122 may provide any number of services, by performing one or more operations. For instance, service component 122, upon receiving data that indicates an optically active article is counterfeit, may generate one or more alerts, reports, or other communications that are sent to one or more other computing devices. Such alerts may include but are not limited to: emails, text messages, lists, phone calls, or any other suitable communications. In some examples, user interface (UI) component 124 may act as an intermediary between various components and modules of computing device 116 to process and send input detected by input devices to other components and modules, and generate output from other components and modules that may be presented at one or more output devices. For instance, UI component 124 may generate one or more user interfaces for display, which may include data and/or graphical representations of alerts, reports, or other communications as described above.

In some examples, a one-way function may be applied to article message 126 to generate an encoded value. The encoded value may be a bitstring with a cardinality of bit positions equal to cardinality of the security features. If the respective value at a respective bit position for a security element is 1', the construction device may create an active security element at its respective location on the optically active article. If the respective value at a respective bit position for a security element is '0', the construction device may create an inactive security element at its respective location on the optically active article. The converse of 1' and '0' for inactive and active security elements may also be used to create the security elements.

Although the example of FIG. 1 described determining whether various locations of security elements are active or inactive, other uses of security elements are possible. For instance, security component 120 may determine whether a distance or set of distances between one or more security elements satisfies one or more validation configurations. Any geometric and/or spatial characteristics of one or more security elements may be used to determine whether an optically active article is counterfeit. In some examples, security component 120 may determine whether a total size or set of sizes of security elements satisfy one or more validation configurations. In some examples, the shapes of one or more security elements may be used to determine whether an optically active article is counterfeit. A texture, pattern, feature detectable at a particular wavelength, or other visual appearance of security elements may be used to determine whether an optically active article is counterfeit.

Figure 2:
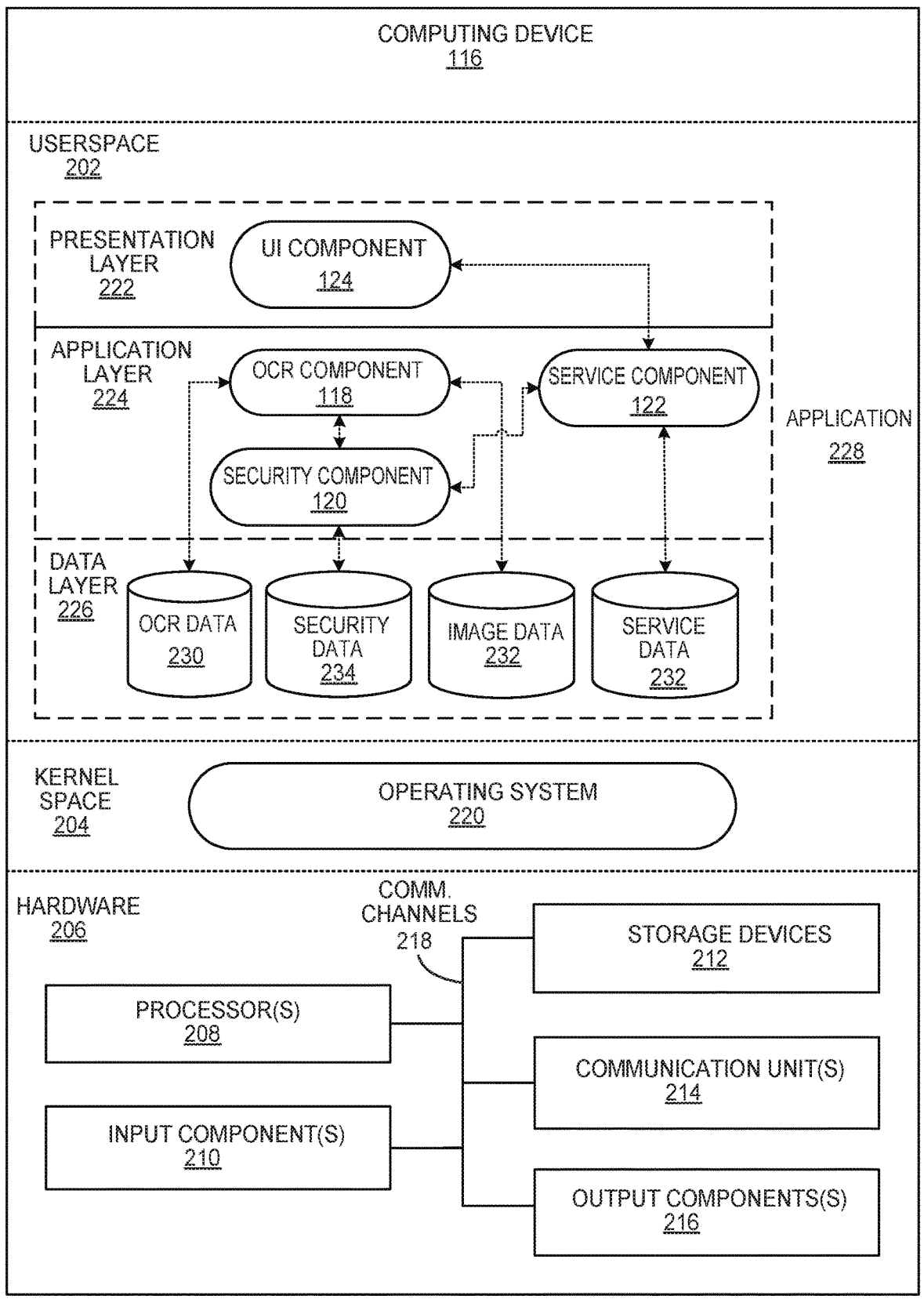
FIG. 2 is a block diagram illustrating an example computing device, in accordance with one or more aspects of the present disclosure.

FIG. 2 is a block diagram illustrating an example computing device, in accordance with one or more aspects of the present disclosure. FIG. 2 illustrates only one particular example of computing device 116, as shown in FIG. 1. Many other examples of computing device 116 may be used in other instances and may include a subset of the components included in example computing device 116 or may include additional components not shown example computing device 116 in FIG. 2. In some examples, computing device 116 may be a server, tablet computing device, smartphone, wrist- or head-worn computing device, laptop, desktop computing device, or any other computing device that may run a set, subset, or superset of functionality included in application 228.

As shown in the example of FIG. 2, computing device 116 may be logically divided into user space 202, kernel space 204, and hardware 206. Hardware 206 may include one or more hardware components that provide an operating environment for components executing in user space 202 and kernel space 204. User space 202 and kernel space 204 may represent different sections or segmentations of memory, where kernel space 204 provides higher privileges to processes and threads than user space 202. For instance, kernel space 204 may include operating system 220, which operates with higher privileges than components executing in user space 202.

As shown in FIG. 2, hardware 206 includes one or more processors 208, input components 210, storage devices 212, communication units 214, and output components 216. Processors 208, input components 210, storage devices 212, communication units 214, and output components 216 may each be interconnected by one or more communication channels 218. Communication channels 218 may interconnect each of the components 208, 210, 212, 214, and 216 for inter-component communications (physically, communicatively, and/or operatively). In some examples, communication channels 218 may include a hardware bus, a network connection, one or more inter-process communication data structures, or any other components for communicating data between hardware and/or software.

One or more processors 208 may implement functionality and/or execute instructions within computing device 116. For example, processors 208 on computing device 116 may receive and execute instructions stored by storage devices 212 that provide the functionality of components included in kernel space 204 and user space 202. These instructions executed by processors 208 may cause computing device 116 to store and/or modify information, within storage devices 212 during program execution. Processors 208 may execute instructions of components in kernel space 204 and user space 202 to perform one or more operations in accordance with techniques of this disclosure. That is, components included in user space 202 and kernel space 204 may be operable by processors 208 to perform various functions described herein.

One or more input components 242 of computing device 116 may receive input. Examples of input are tactile, audio, kinetic, and optical input, to name only a few examples. Input components 242 of computing device 116, in one example, include a mouse, keyboard, voice responsive system, video camera, buttons, control pad, microphone or any other type of device for detecting input from a human or machine. In some examples, input component 242 may be a presence-sensitive input component, which may include a presence-sensitive screen, touch-sensitive screen, etc.

One or more output components 216 of computing device 116 may generate output. Examples of output are tactile, audio, and video output. Output components 216 of computing device 116, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output. Output components 216 may be integrated with computing device 116 in some examples. In other examples, output components 216 may be physically external to and separate from computing device 116, but may be operably coupled to computing device 116 via wired or wireless communication. An output component may be a built-in component of computing device 116 located within and physically connected to the external packaging of computing device 116 (e.g., a screen on a mobile phone). In another example, presence-sensitive display 202 may be an external component of computing device 116 located outside and physically separated from the packaging of computing device 116 (e.g., a monitor, a projector, etc. that shares a wired and/or wireless data path with a tablet computer).

One or more communication units 214 of computing device 116 may communicate with external devices by transmitting and/or receiving data. For example, computing device 116 may use communication units 214 to transmit and/or receive radio signals on a radio network such as a cellular radio network. In some examples, communication units 214 may transmit and/or receive satellite signals on a satellite network such as a Global Positioning System (GPS) network. Examples of communication units 214 include a network interface card (e.g. such as an Ethernet card), an optical transceiver, a radio frequency transceiver, a GPS receiver, or any other type of device that can send and/or receive information. Other examples of communication units 214 may include Bluetooth®, GPS, 3G, 4G, and Wi-Fi® radios found in mobile devices as well as Universal Serial Bus (USB) controllers and the like.

One or more storage devices 212 within computing device 116 may store information for processing during operation of computing device 116. In some examples, storage device 212 is a temporary memory, meaning that a primary purpose of storage device 212 is not long-term storage. Storage devices 212 on computing device 116 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 212, in some examples, also include one or more computer-readable storage media. Storage devices 212 may be configured to store larger amounts of information than volatile memory. Storage devices 212 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 212 may store program instructions and/or data associated with components included in user space 202 and/or kernel space 204.

As shown in FIG. 2, application 228 executes in userspace 202 of computing device 116. Application 228 may be logically divided into presentation layer 222, application layer 224, and data layer 226. Presentation layer 222 may include user interface (UI) component 228, which generates and renders user interfaces of application 228. Application 228 may include, but is not limited to: UI component 124, OCR component 118, security component 120, and one or more service components 122. For instance, application layer 224 may OCR component 118, service component 122, and decoding component 120. Presentation layer 222 may include UI component 124.

Data layer 226 may include one or more datastores. A datastore may store data in structure or unstructured form. Example datastores may be any one or more of a relational database management system, online analytical processing database, table, or any other suitable structure for storing data. OCR datastore 230 may include matrix matching data to perform pixel-by-pixel comparisons, such as stored glyphs. OCR datastore 230 may include feature matching data to perform feature identification, such as glyph features of a set of corresponding symbols. Security data 234 may include data specifying one or more validation functions and/or validation configurations. Service data 232 may include any data to provide and/or resulting from providing a service of service component 122. For instance, service data may include information about optically active articles (e.g., vehicle registration information), user information, or any other information. Image data 232 may include one or more images that are received from one or more image capture devices. In some examples, the images are bitmaps, Joint Photographic Experts Group images (JPEGs), Portable Network Graphics images (PNGs), or any other suitable graphics file formats.

In the example of FIG. 2, one or more of communication units 214 may receive, from an image capture device, an image of an optically active article that includes a set of one or more symbols and one or more security elements. In some examples, UI component 124 or any one or more components of application layer 224 may receive the image of the optically active article and store the image in image data 232.

In response to receiving the image, OCR component 118 may determine that a particular image region of the image represents at least one symbol. For instance, as described in FIG. 1, by applying one or more OCR techniques to the image region 140, OCR component 118 may determine that the image region 140 represents the symbol '2'. As an example, OCR component 118 may compare the image region to OCR data 230 to identify a match. Upon determining a matching between OCR data 230 and the image region, OCR component 118 determines the symbol associated with the OCR data that resulted in a match. OCR component 118 may send data to security component 120 that indicates the symbol '2'. In some examples, OCR component 118 may identify other symbols included in the article message of FIG. 1, such as 'R', 'Z', 'A', '4', and '5'.

In some examples, security component 120 uses data indicating the symbol '2' to select or otherwise determine data from decoding data 234 that indicates properties of security elements. The properties of security marks may include but are not limited to location, size, shape, pattern, composition, retroreflective properties, appearance under a given wavelength, or any other spatial characteristic of one or more security marks. Security component 120 may determine whether optically active article 108 is counterfeit based at least in part on determining whether the at least one symbol (e.g., the '2' symbol) is valid for at least one security element. As described in FIG. 1 security component 120 may include one or more validation functions and/or one or more validation conditions on which the construction of optically active article 108 is based. For instance, security component 120 may include the validation condition that security elements 132A-132C must be active in image 109 if the least significant symbol position of the article message is '2'.

In FIG. 2, security component 120 determines, using a validation function based on the validation condition in security data 234, that security elements 132A-132C and the least significant symbol position of the article message is '2' in optically active article 108. Security component 120, based on determining that the security elements and article message of satisfy the validation configuration, generate data that indicates optically active article 108 is authentic (e.g., not a counterfeit). If security elements 132A-132C and the least significant symbol position of the article message in optically active article 108 did not satisfy the validation criteria, security component 120 may generate data that indicates optically active article is not authentic (e.g., counterfeit).

Service component 122 may perform one or more operations based on the data generated by security component 120 that indicates whether the optically active article is a counterfeit. Service component 122 may, for example, query service data 232 to retrieve a list of recipients for sending a notification or store a information that indicates details of the image of the optically active article (e.g., object to which optically active article is attached, image itself, metadata of image (e.g., time, date, location, etc.)). In response to, for example, determining that the optically active article is a counterfeit, service component 122 may send data to UI component 124 that causes UI component 124 to generate an alert for display. UI component 124 may send data to an output component of output components 216 that causes the output component to display the alert.

In some examples, security component 122 may use both a visible light image captured under visible lighting and an IR light image captured under IR light to determine whether an optically active article is counterfeit. For instance, if counterfeiter places an obstructing material (e.g., opaque, non-reflective, etc.) over a security element to make it appear the opposite of what it is (e.g., make an active element appear inactive or vice versa), then security component 122 may determine from the visible light image that obstructing material has been added the optically active article. Therefore, even if the IR light image includes a valid configuration of security elements (due to the obstructing material at various locations), security component 122 may determine that the visible light image includes the obstructing material and is therefore counterfeit.

As another example, for a given lettering on the plate (ABC 123), a sheeting variant can be detected such that the entirety or a subsection of the lettering determines which sheeting variant to select (e.g.: ABC 123+Sheeting_10 vs ABC 223+Sheeting_5). Various implementations may be used to establish a relationship between article message and a retroreflective sheet. For example, the relationship between the article message and a sheeting version can be established by inputting the symbols of the article message into a function to generate a code that can later be used for verification. Relative geometries created by the sheeting features can also be used to relate letters to sheeting variant. For example, three such features on the sheeting if not co-linear could be used to create a triangle whose angles and/or position could relate to the lettering. Sheeting features could be placed at fixed positions (such as on a grid) where presence or absence of a dark feature, light feature could encode or represent data. If only using on/off states for each position, this could carry a binary code that could contain the bits of a verification code. Some examples such that features can only be present at specific locations, and instead of only considering the (for example) dark features at three locations, the other potential locations are evaluated to enable higher confidence that a plate is correct and the reader is not being confused by dirt on the plate. The other locations could either be sheeting color, or could be lighter than background sheeting (perhaps with contrast enhancing darkness outlining the region). In some examples, locating the features encoding units, as described in this disclosure, could provide a confidence level that could be increased by evaluating the other locations. Color images in addition to retro IR could be collected to differentiate between retroreflective sheet features which darken only retroreflective and counterfeiting attempts which would utilize ink to darken similar portions of the plate. In some examples, for retroreflective sheet features, darkening may occur in retroreflective IR but lighter appearance with ambient color, for an ink-based counterfeiting both would show a dark feature.

In some examples, one or more security elements may not overlap with the article message. In some examples, all of the security elements may overlap with the article message. In other examples, one or more security elements may overlap with the article message. In some examples, none of the security elements may overlap with the article message.

In some examples, security component 120 may determine one or more predefined image regions (e.g., stored in security data 234) that correspond to security elements for the optically active article. Security component 120 may inspect one or more of the predefined image regions within the image of the optically active article and determine, based at least in part on one or more pixel values in the predefined image regions, one or more values that represent the validation information.

In some examples, security component 120, when determining, based at least in part on one or more pixel values in the predefined image regions, one or more values that represent the validation information further comprises may further determine one or more values that represent the validation information based at least in part one whether the one or more predefined image regions of security elements are active or inactive. In some examples, security component 120 may determine the validation information that is detectable outside the visible light spectrum from the at least one security element further by determining the validation information based at least in part on at least one of a location, shape, size, pattern, composition of the at least one security element.

In some examples, security component 120 may determine whether the optically active article is counterfeit based on whether a combination of one or more symbols of the article message and the validation information represent a valid association.

Figure 3:
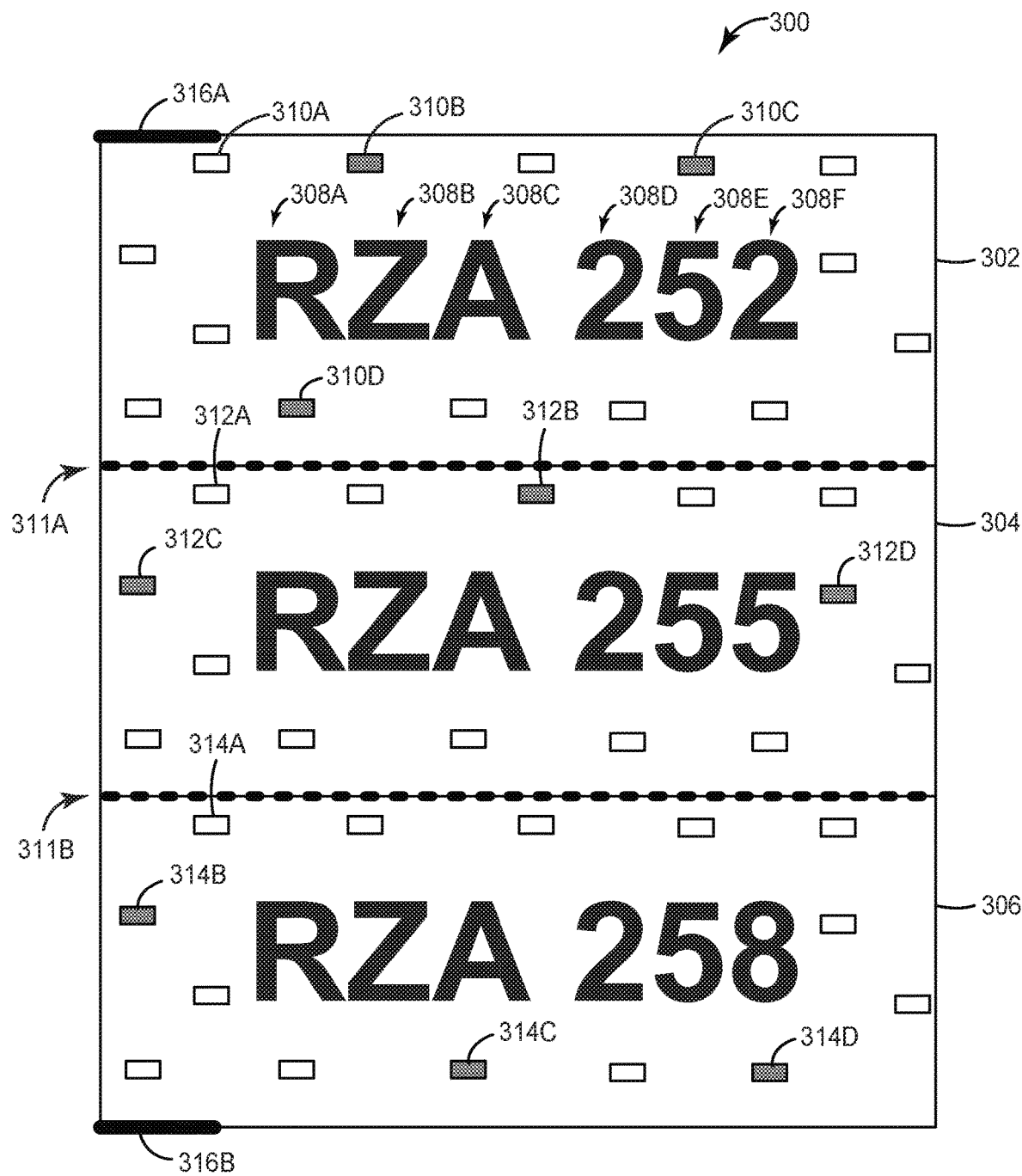
FIG. 3 is a conceptual diagram of a set of retroreflective sheet with security elements to detect counterfeit optically active articles, in accordance with techniques of this disclosure.

FIG. 3 is a conceptual diagram of a set of retroreflective sheeting with security elements to detect counterfeit optically active articles, in accordance with techniques of this disclosure. FIG. 3 illustrates a continuous retroreflective sheet 300, which may be a portion of a roll of continuous retroreflective sheeting. For instance, continuous retroreflective sheet 300 may include additional continuous retroreflective sheeting adjacent to the top boundary of reflective sheet 302 and the bottom boundary of retroreflective sheet 306. Continuous retroreflective sheet 300 may be cut or severed at cut locations 311A-311B, which are illustrated as dashed lines. The dashed lines are illustrated for example purposes in FIG. 3 and may not be printed by a flexographic printer. Continuous retroreflective sheet 300 may be cut or severed at each cut location, such that reflective sheets 302, 304, and 306 are each equal to surface area of an aluminum plate of a license plate. Each of retroreflective sheets 302, 304, and 306 may be applied to an aluminum plate to construct a respective license plate.

In a manufacturing or other construction process to create optically active articles, continuous retroreflective sheet 300 may be printed with article message and security elements. For instance, the continuous retroreflective sheet may be streamed off the roll through a printer or other construction device that is controlled by a computing device, such as computing device 134 shown in FIG. 1. As the continuous retroreflective sheet is streamed, continuous retroreflective sheet 300 may be printed with article message and security elements. Security elements 310B-310D may not be printed with ink comprising barrier material as described in FIG. 1, such that security elements 310B-310D do not enable retroreflection of infrared light. By contrast, the other remaining security elements, such as security element 310A (and other security elements in retroreflective sheet 302 that are similar in appearance to security 310A but not labeled with reference numerals) may be printed with ink that forms a barrier material.

Each of respective retroreflective sheets 302, 304, and 306 may be printed with a different set or pattern of security elements. For instance, security elements 312B-312D may not include barrier material, such that security elements 312B-312D do enable not reflect infrared light. By contrast, the other remaining security elements, such as security element 312A (and other security elements in retroreflective sheet 304 that are similar in appearance to security 312A but not labeled with reference numerals) may be printed with ink that forms a barrier material. As is apparent from FIG. 3, retroreflective sheet 304 includes a different set of security elements that do not include a barrier material than in retroreflective sheets 302 and 306.

In some examples, computing device 134 may include a printing specification that prints a repeating pattern or set of security elements. For instance, the set or pattern of security elements in retroreflective sheet 302 may repeat in the retroreflective sheet that is adjacent to and immediately following the bottom boundary retroreflective sheet 306. In this way, a particular printed set or pattern of security elements repeats every third retroreflective sheet in continuous retroreflective sheet 300, in the example of FIG. 3. In other examples, any interval may be used to repeat the printed set or pattern of security elements every N-th retroreflective sheet. In other examples, the set or pattern of security elements printed in each respective retroreflective sheet of the overall retroreflective sheet may be random. In still other examples, each retroreflective sheet of continuous retroreflective sheet may be user-specified or machine-specified based on a printing specification. In any case, a computing device, such as computing device 134 shown in FIG. 1, may control the printer or other construction device to print security elements and article message in a particular manner.

In the example of FIG. 3, computing device 134 may cause construction device 138 to print repeating patterns of security elements every third sheet as described above. For instance, the pattern of security elements for every N-th sheet matches the pattern of retroreflective sheet 302. The pattern of security elements for every (N+1)-th sheet matches the pattern of retroreflective sheet 304, and the pattern of security elements for every (N+2)-th sheet matches the pattern of retroreflective sheet 306. Computing device 134 may include a set of article message (e.g., license plate numbers) that will be printed to retroreflective sheets of continuous retroreflective sheet 300.

A first validation configuration may specify that article message having an integer between 0-2 at the least significant symbol position of article message will be valid for a pattern of security elements as shown in retroreflective sheet 302. Accordingly computing device 134 may select "RZA 252" from a set of article message and print "RZA 252" as article message on retroreflective sheet 302. A second validation configuration may specify that article message having an integer between 3-6 at the least significant symbol position of the article message will be valid for a pattern of security elements as shown in retroreflective sheet 304. Accordingly computing device 134 may select "RZA 255" from a set of article message and print "RZA 255" as article message on retroreflective sheet 304. A third validation configuration may specify that article message having an integer between 7-9 at the least significant symbol position of the article message will be valid for a pattern of security elements as shown in retroreflective sheet 306. Accordingly computing device 134 may select "RZA 258" from a set of article message and print "RZA 258" as article message on retroreflective sheet 306.

As described in FIG. 1, security component 122 may include a validation function to confirm that an optically active article is printed in accordance with one or more validation configurations. For instance, security component 122 may include a validation function that confirms a license plate has been printed in accordance with the first, second, and/or third validation configurations as described above in the example of FIG. 3. In this way, if a license plate with article message having an integer value at the least significant symbol position does not conform to the pattern of security elements specified in a validation configuration, then security component 122 may identify a counterfeit license plate.

In the example of FIG. 3 described above, the third validation configuration may specify that article message having an integer between 7-9 at the least significant symbol position of the article message will be valid for a pattern of security elements as shown in retroreflective sheet 306. Accordingly computing device 134 selected "RZA 258" from a set of article message and printed "RZA 258" as article message on retroreflective sheet 306. In alternative examples, computing device 134 may initially select the article message, such as "RZA 258", and based on a validation configuration, print the corresponding set or pattern of security elements. That is, in the former example of FIG. 3, the pattern or set of security elements printed on a retroflective sheet caused computing device 134 to then select article message for the retroreflective sheet. In an alternative example of FIG. 3, the article message that was printed on a retroflective sheet may cause computing device 134 to then print a particular set or pattern of security elements according to a validation configuration.

Computing device 134 may determine which pattern or set of security elements are printed on a retroreflective sheet based on one or more registration marks that indicate when patterns or sets of security elements will repeat on a continuous retroreflective sheet. In some examples, registration marks 316A-316B are repeated once per cycle of a repeating pattern or set of security elements. If an image capture device detects a registration mark 316B during manufacturing, the construction device may determine, for example, whether a particular reflective sheet includes the Nth, (N+1)-th, (N+2)-th set or pattern of security elements based on reference to the registration mark. Computing device 134 may determine which pattern or set of security elements are printed on a retroreflective sheet based on capturing an image of the retroreflective sheet and determining, for example, which security elements are active or inactive. Computing device 134 may determine which pattern or set of security elements are printed on a retroreflective sheet based the interval or position of a retroreflective sheet in a continuous retroreflective sheet (e.g., the Nth, (N+1)-th, (N+2)-th sheet).

Figure 4:
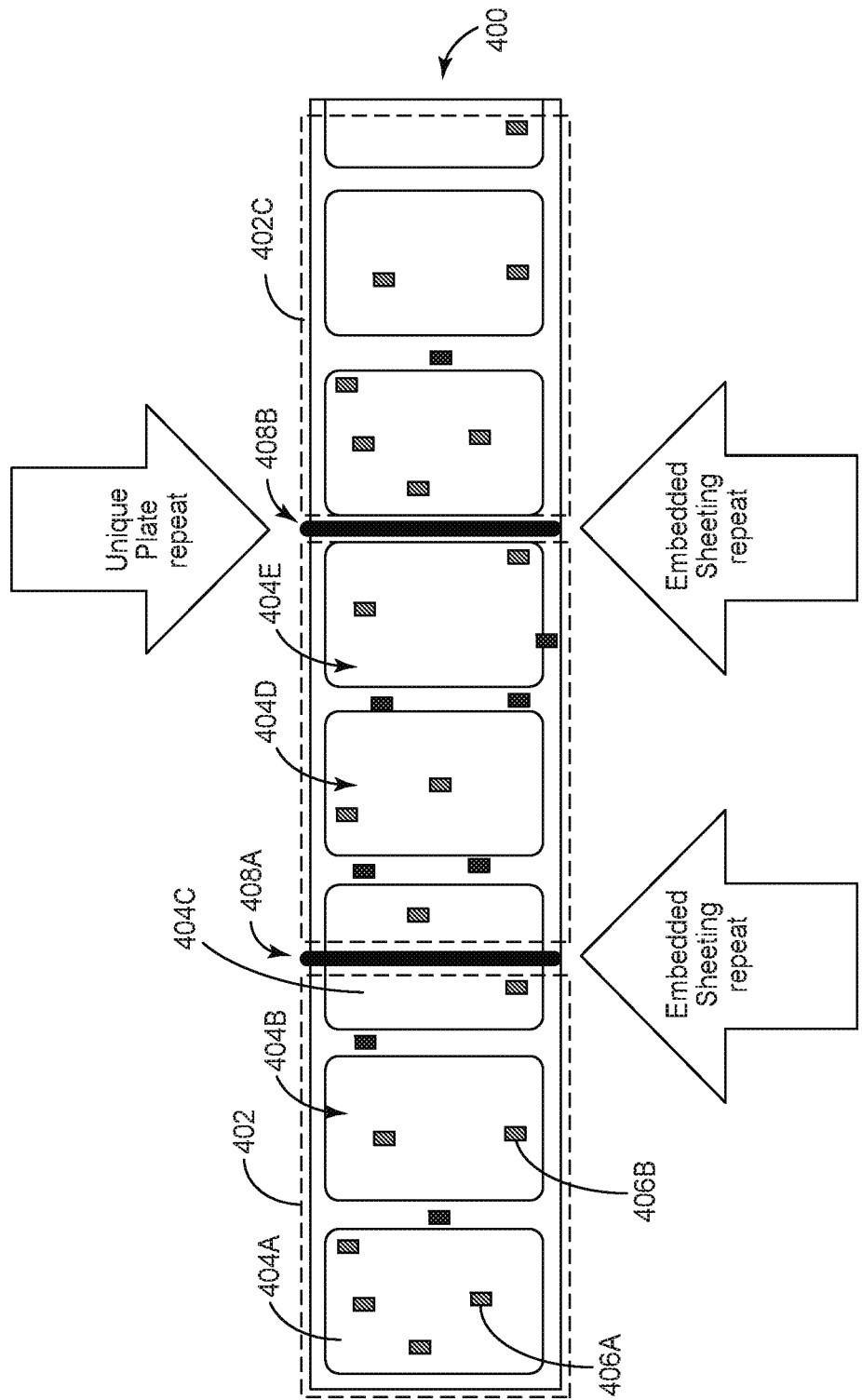
FIG. 4 is a conceptual diagram in which a pattern or set of security elements that repeat on a non-integer interval, in accordance with techniques of the disclosure.

FIG. 4 is a conceptual diagram in which a pattern or set of security elements that repeat on a non-integer interval, in accordance with techniques of the disclosure. In the example of FIG. 3, registration makers are included in the sheet using a repeating pattern. This technique provides a unique set of sheeting blanks equal to the length of the pattern divided by the size of the blank (or plate). FIG. 4 illustrates creating a length of repeat on the registration marker that does not measure out to a multiple of the sheet size. As such, the technique of FIG. 4 will create a slightly different version of the sheeting blank each time through the pattern until that pattern of patterns eventually repeats. for example FIG. 4 may illustrate distance between registration markers 408A-408B of 15", and each sheeting blank (e.g., retroreflective sheets 404A-404E) is 6", then the pattern (e.g., 402) will repeat each 2.5 sheeting blanks, using two print cycles to start to repeat a specific sheeting blank. The result is five unique plates, i.e., five plates with different patterns or sets of security elements (e.g., security elements 406A, 406B). In FIG. 4, each of plates 404A-404E has a different pattern or set of security elements in accordance with pattern 402 that repeats every 2.5 sheeting blanks. For illustration purposes, FIG. 4 illustrates an example of a pattern of security elements that repeats on non-integer interval of 2.5 sheeting blanks; however, any non-integer interval across any number of retroreflective sheets may be possible.

Figure 5:
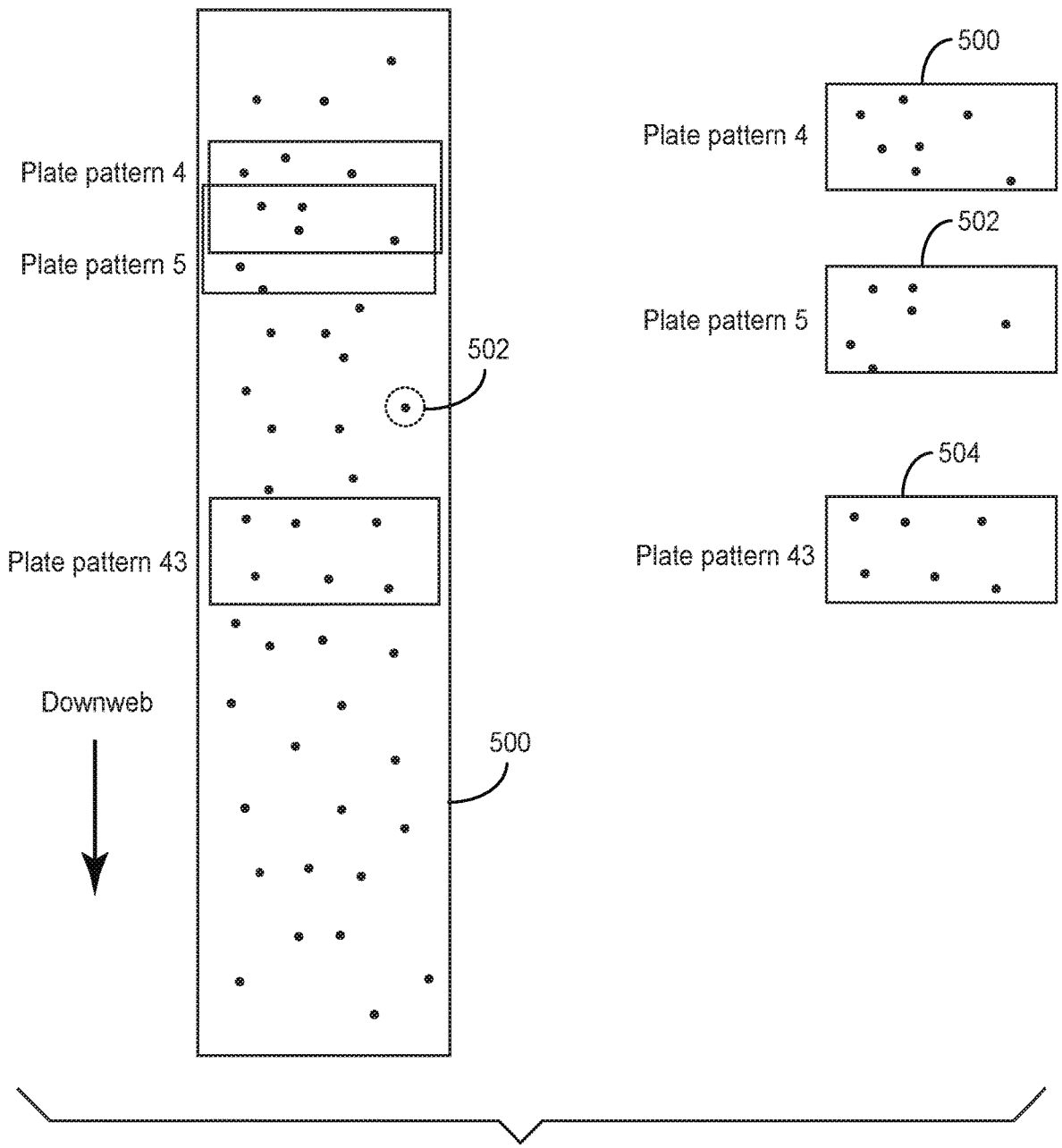
FIG. 5 is a conceptual diagram of a randomized pattern of security elements, in accordance with techniques of this disclosure.

FIG. 5 is a conceptual diagram of a randomized pattern of security elements, in accordance with techniques of this disclosure. FIG. 5 illustrates portion of retroreflective sheet 500 that represents a single revolution around a flexographic print roller. Retroreflective sheet 500 includes security elements, such as security element 502. Other security elements, similar in appearance to security element 502 are shown without reference numerals for purposes of clarity and brevity. A flexographic printer may include a printing roller which applies ink according to a pattern or set of markings on the printing roller. Based on where the retroreflective sheet is severed or cut (e.g., according to the height of a license plate), different patterns or sets of security elements will be included in different respective portions of the overall retroreflective sheet 500. For instance, retroreflective sheets 500, 502, and 504 include different patterns of security elements based on where the respective retroreflective sheets are cut or severed from retroreflective sheet 500.

In some examples, security features are embedded utilizing a predetermined pattern. In FIG. 5, security elements may be randomly created either by machine-implement logic or by some probability space, either of which may be implemented at a computing device such as computing device 134. Computing device 134, for example, may evaluate the security elements of a retroreflective sheet to be printed, and then calculate what a valid plate message would be for that sheeting based on, for example, machine-implement logic as described in FIG. 3. FIGS. 4-5 shows several retroreflective sheets 500, 502, 504 resulting from non-registered positions being selected on the sheeting. This technique may reduce the need for precise registration of retroreflective sheets to a specific repeating section of embedded markers in the sheeting. This technique of FIGS. 4-5 may also create the potential to have customer specific embedded marker patterns, as it may increase the possibilities for unique retroreflective sheets.

Figure 6:
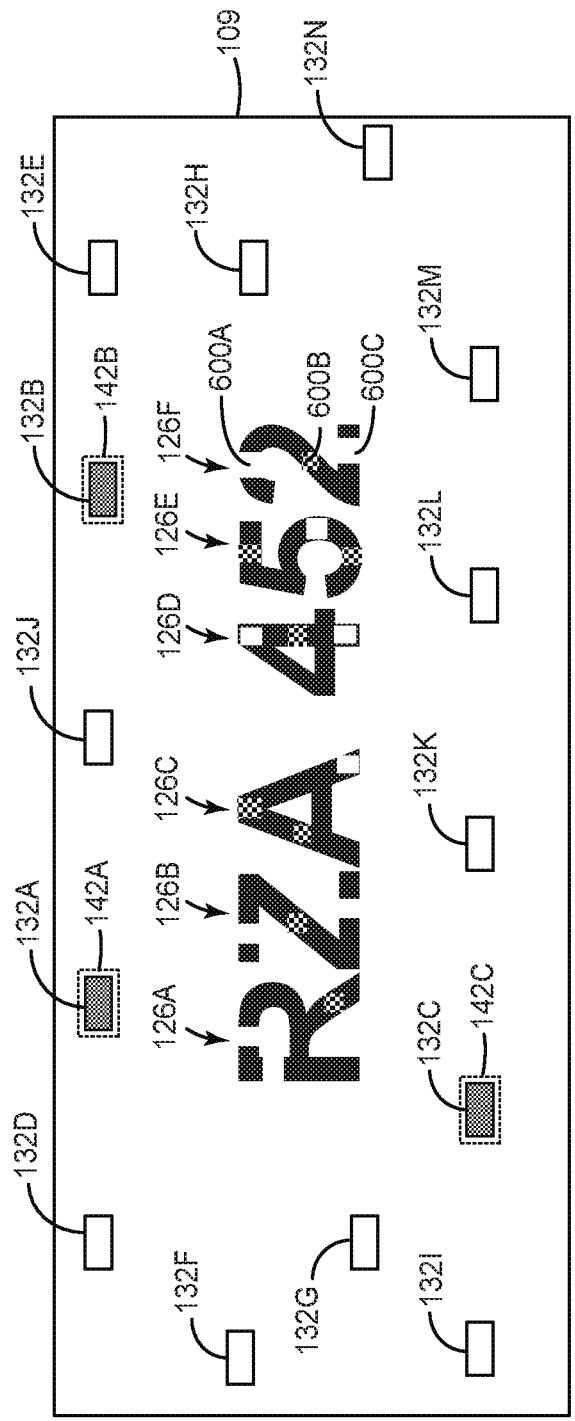
FIG. 6 is a conceptual diagram of an image of an optically active article that includes security features and encoding regions to detect whether the optically active article is counterfeit, in accordance with techniques of this disclosure.

FIG. 6 is a conceptual diagram of an image of an optically active article that includes security features and encoding regions to detect whether the optically active article is counterfeit, in accordance with techniques of this disclosure. FIG. 6 illustrates image 109 as described in FIG. 1, with the addition of encoding regions, such as encoding regions 600A, 600B, and 600C. Examples of encoding regions are further described in U.S. Provisional Patent No. 62/316,747 entitled "Encoding Data in Symbols Disposed on an Optically Active Article", filed Apr. 1, 2016, which is hereby expressly incorporated by reference in its entirety. In the example of FIGS. 1 and 6, optically active article 108 (e.g., a license place) includes article message 126A-126F. In FIG. 6, each instance of article message 126 is a symbol from a symbol set. The symbol set may be an alphabet, number set, and/or any other set of glyphs. In FIG. 6, the symbol set includes at least the letters of Roman alphabet and Arabic numerals.

In the example of FIG. 6, each symbol includes one or more encoding regions such as 600A-600C. An encoding region may be a location, region, or area of optically active article 108 that may be selectively printed with either (1) visibly-opaque, infrared-opaque cyan, magenta and yellow (CMY) inks or (2) visibly-opaque, infrared-opaque inks (e.g., inks containing carbon black). In some examples, an encoding region is embedded within an instance of printed information, such encoded data unit 600A being included within the boundary of article message 126F (e.g., Arabic numeral '2'). A boundary or perimeter of a symbol may be an interface between a first set of pixel values that represent the symbol and a second set of pixel values that represent space (e.g., whitespace) surrounding or within the representation of the symbol. In some examples, a boundary or perimeter of a symbol may have more than one interface, such as an 'A' which includes an interior interface (e.g., the center whitespace within the 'A' glyph) and an exterior interface (e.g., the whitespace surrounding the 'A' glyph). In some examples, an encoding region may be "active" or "inactive". In the example of FIG. 6, an encoding region (e.g., 600A), which is printed with visibly-opaque, infrared-transparent ink, and that reflects light above a threshold light intensity is inactive, while an encoding region (e.g., 600B), which is printed with visibly-opaque, infrared-opaque ink, and that does not reflect light above the threshold light intensity is active. In an alternative example, an encoding region, which is printed with visibly-opaque, infrared-transparent ink, and that reflects light above a threshold light intensity is active, while an encoding region, which is printed with visibly-opaque, infrared-opaque ink, and that does not reflect light above the threshold light intensity is inactive. For purposes of this disclosure, inactive encoding regions are generally described as regions printed with visibly-opaque, infrared-transparent ink.

As shown in FIG. 6, encoding regions 600A and 600C are printed with a combination of visibly-opaque, infrared-transparent CMY ink (e.g., "process black") and encoding region 600B is printed with visibly-opaque, infrared-opaque inks. For purposes of illustration, encoding region 600B printed with the visibly-opaque, infrared-transparent CMY ink is shown as cross-hatched in FIG. 6, although under the human-visible light spectrum, encoding region 600B may appear as other non-encoding regions of information 126F (e.g., flat black). In FIG. 1, printed information 126F, may be printed with a combination of visibly-opaque, infrared-opaque black ink except for the location of embedded data units 600.

When printed information 126 is exposed to infrared light 127 from light source 104, the infrared light will reflect back to image capture device 102 from locations corresponding to inactive encoding regions 600A and 600C. Since active encoding region 600B is printed with visibly-opaque, infrared-opaque inks, infrared light 127 is absorbed within the boundary of the '2' character everywhere except inactive encoding regions 600A and 600C. Infrared light will reflect from optically active article 108 at the locations of inactive encoding regions 600A and 600B, as well as other active encoding regions of optically active article 108 that are printed with visibly-opaque, infrared-transparent inks (and not visibly-opaque, infrared-opaque inks). As such, an infrared image captured by image capture device 102 will appear as shown in FIG. 6, with whitespace, gaps, or voids in locations printed with visibly-opaque, infrared-transparent inks, while other locations printed with visibly-opaque, infrared-opaque inks will appear as black or otherwise visually distinguishable from the visibly-opaque, infrared-transparent inks.

In some examples, inactive encoding regions 600A and 600C, when printed with visibly-opaque, infrared-transparent inks, appear opaque, black, or dark to image capture device 102 under a first spectral range and appear relatively transparent, bright, or white to image capture device 102 under a second spectral range. Portions of information 126F (including active encoding region 600B) printed with visibly-opaque, infrared-opaque inks appear opaque or black to image capture device 102 under the second spectral range and appear opaque or black to image capture device 102 under the first spectral range. In some examples, the first spectral range is from about 350 nm to about 700 nm (i.e., visible light spectrum) and the second spectral range is from about 700 nm to about 1100 nm (i.e., near infrared spectrum). In some examples, the first spectral range is from about 700 nm to about 850 nm, and the second spectral range is between 860 nm to 1100 nm.

In some examples, inactive encoding regions 600A and 600C appear opaque or black to capture device 102 under a first lighting condition and appear transparent or white to capture device 102 under a second lighting condition, whereas active encoding region 600B appears opaque or black to capture device 102 under the second lighting condition and under the first lighting condition. In some examples, the first lighting condition is an ambient visible condition (i.e., diffuse visible light) and the second lighting condition is a visible retroreflective condition (i.e., coaxial visible light). In some examples, the position(s) of the light source(s) is different in the first and second lighting conditions.

In some examples, suitable printing techniques include screen printing, flexographic printing, and digital printing such as, for example, thermal mass transfer printing, laser printing and inkjet printing. One advantage of using digital printing is that information can be easily and quickly customized/altered to meet customer needs, without having to produce new screens or flexographic sleeves.

In some examples, printing of the encoding regions and the non-encoded region portions of the symbols are done in registration so that they completely overlap. In some examples, active encoding regions are printed first on the retroreflective substrate, followed by printing of the non-encoded region portions of the symbols, or vice versa. In some examples, the human-readable information and/or machine-readable information are printed using the materials described in co-pending U.S. Patent Application No. 61/969,889 (Attorney Docket No. 75057US002), the disclosure of which is incorporated herein by reference in its entirety, although other suitable materials may also be used.

In some examples, encoded regions include at least one of an infrared-reflecting, infrared-scattering and infrared-absorbing material. The use of these materials create contrast in the infrared spectrum, and therefore appear "dark" when viewed under such conditions. Exemplary materials that can be used include those listed in U.S. Pat. No. 8,865,293 (Smithson et al), the disclosure of which is incorporated herein by reference in its entirety.

In some examples, a human operator may specify different symbol variants from a symbol set that includes multiple variants of the same symbol but with different encodings of the encoding regions. For instance, a symbol set may include multiple variants of the 'R' character with the following values: $\{R_0:000\}$, $\{R_1:001\}$ . . . $\{R_7:111\}$. To encode a bitstring in a particular set of symbols, the human operator may specify the set of symbol variants that correspond to bitstring 001010110010101010, where for example $\{R_1: 001\}$ corresponds to the underlined bit positions. In some examples, the user may specify one or more characters or strings from a character set that are translated to a set of symbol variants comprising encoding regions that are encoded to represent the bit string for the one or more characters or strings from a character set. For instance, a set of data {vehicle model, license issue state, license issue year} is translated to bitstring {$R_1, Z_2, A_6, 4_2, 5_5, 2_2,$}.

In some examples, encoding units 600 may be printed on an optically active article for use in detection of a counterfeit without the use of security elements in the optically active article. For instance, the optically active article may be constructed based on a validation configuration that requires a particular set of encoding units to be active (and/or inactive) for a particular set of article message. A validation function implemented at security component 120 may determine, for an image of the optically active article, whether the particular set of encoding units in the image that are active (and/or inactive) comport with the article message for the validation condition with which the optically active article was constructed. If not, security component 120 may identify the optically active article as counterfeit, and if so, security component 120 may identify the optically active article as authentic.

For given lettering on the plate (ABC 123), variants for each can be detected (e.g., $A_1, B_3, C_1, 1_2, 2_3, 3_1$) by security component 120 to identify the characters themselves (e.g., 'A', 'B', etc.) plus encoded values (e.g., '1' or '0' based on active or inactive, or vice versa). Some portion of the encoded values may represent non-verification data (e.g., jurisdiction, vehicle model, etc.). Some other portion of encoded values can consist of verification data such as a cryptographic hash, CRC, checksum, error correction code, or other coding scheme. The verification data may be based on the article message (e.g., characters) of the plate, other non-verification data encoded in the encoding units (such as jurisdiction), and/or a cryptographic salt, to name only a few examples of non-verification data. For one-way functions, security component 120 may determine the correctness of the verification code determined from encoding units in an image of an optically active article by identifying the characters (e.g., ABC 123) and/or non-verification data encoded in the encoding units, and applying a validation function (e.g., a one-way function) that was used to generate verification data for the optically active articles. If the verification code generated from the characters and/or non-verification data encoded in the encoding units does not match the verification code that is encoded in the encoding units, then security component 120 may determine that the plate is counterfeit. If security component 120 determines that the verification data that is encoded in the encoding units matches the verification data generated from the validation function using the characters and/or non-verification data of the plate, then security component 120 may determine that the plate is authentic. In some examples, partial and full correctness of matching portions of the instances of verification data (generated and embedded in the characters) could be used to establish a confidence score regarding authenticity.

In some examples, encoding units and security elements may be included in an optically active article and used in conjunction with one another to detect whether the article is authentic or counterfeit. For instance, a validation configuration may require that a particular encoded value be represented by encoding units of symbols in an optically article for a particular set of security elements that are included in the optically active article. In some examples, a validation configuration may require that a particular encoded value be represented by encoding units of symbols in an optically article for a particular set of security elements that are included in the optically active article, and further that the particular encoded value and/or particular set of security elements be included in an optically active article with a particular set of symbols. If the combination of encoding units, security elements, and/or symbols does not satisfy a validation function based on the validation condition for the combination, then security component 120 may determine that the plate is counterfeit. If a combination of encoding units, security elements, and/or symbols satisfies the validation function based on the validation condition for the combination, then security component 120 may determine that the plate is authentic.

Other data that may be embedded into an optically active article may include: vehicle type or classification, registration information, registration month, access controls for example to a parking garage or restricted entry location, Electronic Vehicle Registration (EVR) type data structures, special plate designations (handicapped for example), to name only a few examples. Techniques of the disclosure could encode data such as Vehicle Identification Number (VIN), or other specific identification marks. Other data that could be encoded includes but is not limited to: issue date, print location, who printed it, ink type, other administrative and pedigree information. The encoded data could also include a special coding for temporary plates, short term privileges, or promotional plates. This encoded data could enable a license plate or other optically active article to be treated like a credential for the vehicle, that would be issued and only valid for a period of time as coded in the characters, or it could require a reissue after a certain amount of time in order to help encourage compliance or adherence to a particular protocol for one reason or another.

In some examples, light in driving and ALPR environments can be divided into the following spectral regions: visible light in the region between about 350 and about 700 nm, and infrared light in the region between about 700 and about 1100 nm. Cameras may have sensitivity that includes both of these ranges, although the sensitivity of a standard camera system decreases significantly for wavelengths longer than 1100 nm. Various light emitting diodes (LEDs) can emit light over this entire wavelength range, and typically most LEDs are characterized by a central wavelength and a narrow distribution around that wavelength. For example, in a system including LEDs emitting light rays having a wavelength of 830 nm+/−20 nm, a suitably equipped camera could detect a license plate in the near infrared spectrum with light not visible to the driver of the vehicle. Thus the driver would not see the "strobe" light effect of the LEDs and would not be distracted by them.

In some examples, cameras and lights are typically mounted to view the license plates at some angle to the direction of vehicle motion. Exemplary mounting locations include positions above the traffic flow or from the side of the roadway. Images may be collected at an angle of 20 degrees to 45 degrees from normal incidence (head-on) to the license plate. A detector which is sensitive to infrared or ultraviolet light as appropriate may be used to detect retroreflected light outside of the visible spectrum. Exemplary detectors include cameras include those sold by 3M Company of St. Paul, Minn., including but not limited to the P372.

Figure 7:
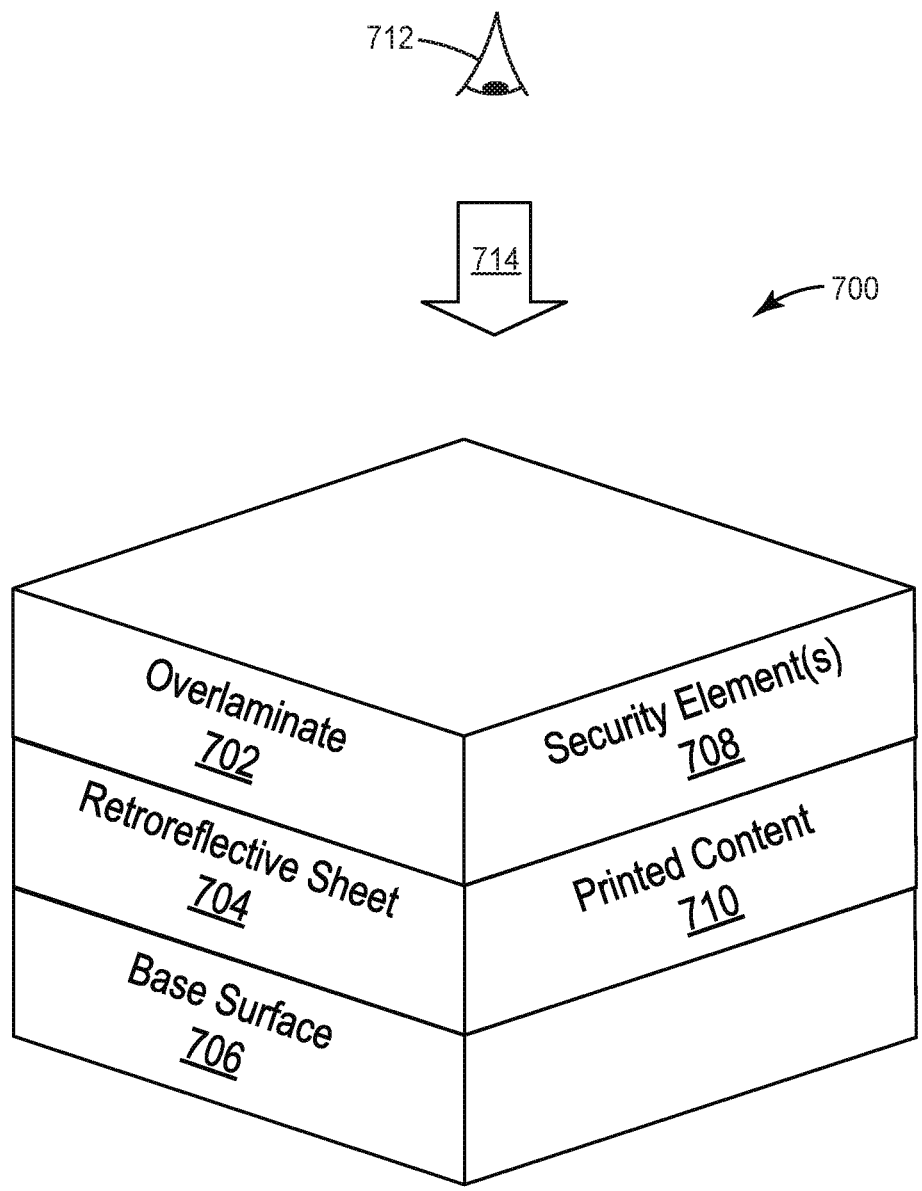
FIG. 7 is a conceptual diagram of a cross-sectional view of an optically active article in accordance with techniques of this disclosure.

FIG. 7 is a conceptual diagram of a cross-sectional view of an optically active article in accordance with techniques of this disclosure. In some examples, such as a license plate, an optically active article may comprise multiple layers. For purposes of illustration in FIG. 7, an optically active article 700 may include a base surface 706. Base surface 706 may be an aluminum plate or any other rigid, semi-rigid, or flexible surface. Retroreflective sheet 704 may be a retroreflective sheet as described in this disclosure. A layer of adhesive (not shown) may be disposed between retroreflective sheet 704 and base surface 706 to adhere retroreflective sheet 704 to base surface 706.

Optically active article may include an overlaminate 702 that is formed or adhered to retroreflective sheet 704. Overlaminate 702 may be constructed of a visibly-transparent, infrared opaque material, such as but not limited to multilayer optical film as disclosed in U.S. Pat. No. 8,865,293, which is expressly incorporated by reference herein in its entirety. In some construction processes, retroreflective sheet 704 may be printed and then overlaminate 702 subsequently applied to reflective sheet 704. A viewer 712, such as a person or image capture device, may view optically active article 700 in the direction indicated by the arrow 714.

As described in this disclosure, in some examples, security elements and article message may both be printed or otherwise included on a retroreflective sheet. In such examples, an overlaminate may be applied over the retroreflective sheet, but the overlaminate may not contain security elements and/or article message. In the example of FIG. 7, article message 710 may be included in retroreflective sheet 704, but security elements 708 may be included in overlaminate 702. In some examples, a security element may be created from or within a visibly-transparent, infrared opaque material that forms an overlaminate. European publication No. EP0416742 describes recognition symbols created from a material that is absorptive in the near infrared spectrum but transparent in the visible spectrum. Suitable near infrared absorbers/visible transmitter materials include dyes disclosed in U.S. Pat. No. 4,581,325. U.S. Pat. No. 7,387,393 describes license plates including infrared-blocking materials that create contrast on a license plate. U.S. Pat. No. 8,865,293 describes positioning an infrared-reflecting material adjacent to a retroreflective or reflective substrate, such that the infrared-reflecting material forms a pattern that can be read by an infrared sensor when the substrate is illuminated by an infrared radiation source. EP0416742 and U.S. Pat. Nos. 4,581,325, 7,387,393 and 8,865,293 are herein expressly incorporated by reference in their entireties. In some examples, overlaminate 702 may be etched with one or more security elements.

In some examples, if overlaminate includes security elements 708 and retroreflective sheet 704 includes article message 710, an image capture device may capture two separate images, where each separate image is captured under a different lighting spectrum or lighting condition. For instance, the image capture device may capture a first image under a first lighting spectrum that spans a lower boundary of infrared light to an upper boundary of 900 nm. The first image may indicate which encoding units are active or inactive. The image capture device may capture a second image under a second lighting spectrum that spans a lower boundary of 900 nm to an upper boundary of infrared light. The second image may indicate which security elements are active or inactive (or present or not present). Any suitable boundary values may be used. In some examples, multiple layers overlaminate, rather than a single layer of overlaminate 702, may be disposed on retroreflective sheet 704. One or more of the multiple layers of overlaminate may have one or more security elements. Techniques described in this disclosure with respect to security elements may be applied to any of the examples described in FIG. 7 with multiple layers of overlaminate.

In some examples, a laser in a construction device may engrave security elements onto sheeting, which enables embedding markers specifically for predetermined meanings like jurisdiction, plate message, or security feature. Example techniques are described in U.S. Provisional Patent Application 62/264,763, filed on Dec. 8, 2015, which is hereby incorporated by reference in its entirety. In such examples, the security markings in the optically active article can be added at print time, rather than being encoded during sheeting manufacture. In some examples, an image capture device may capture an image in which the engraved security elements are distinguishable from other content of the optically active article.

The following examples provide other techniques for creating security elements in an optically active article, in which the security elements, when captured by an image capture device, may be distinguishable from other content of the optically active article. For instance, a security element may be created using at least two sets of indicia, wherein the first set is visible in the visible spectrum and substantially invisible or non-interfering when exposed to infrared radiation; and the second set of indicia is invisible in the visible spectrum and visible (or detectable) when exposed to infrared. Patent Publication WO/2015/148426 (Pavelka et al) describes a license plate comprising two sets of information that are visible under different wavelengths. The disclosure of WO/2015/148426 is expressly incorporated herein by reference in its entirety. In yet another example, a security element may be created by changing the optical properties of at least a portion of the underlying substrate. U.S. Pat. No. 7,068,434 (Florczak et al), which is expressly incorporated by reference in its entirety, describes forming a composite image in beaded retroreflective sheet, wherein the composite image appears to be suspended above or below the sheeting (e.g., floating image). U.S. Pat. No. 8,950,877 (Northey et al), which is expressly incorporated by reference in its entirety, describes a prismatic retroreflective sheet including a first portion having a first visual feature and a second portion having a second visual feature different from the first visual feature, wherein the second visual feature forms a security mark. The different visual feature can include at least one of retroreflectance, brightness or whiteness at a given orientation, entrance or observation angle, as well as rotational symmetry. Patent Publication No. 2012/281285 (Orensteen et al), which is expressly incorporated by reference in its entirety, describes creating a security mark in a prismatic retroreflective sheet by irradiating the back side (i.e., the side having prismatic features such as cube corner elements) with a radiation source. U.S. Patent Publication No. 2014/078587 (Orensteen et al), which is expressly incorporated by reference in its entirety, describes a prismatic retroreflective sheet comprising an optically variable mark. The optically variable mark is created during the manufacturing process of the retroreflective sheet, wherein a mold comprising cube corner cavities is provided. The mold is at least partially filled with a radiation curable resin and the radiation curable resin is exposed to a first, patterned irradiation. Each of U.S. Pat. Nos. 7,068,464, 8,950,877, US 2012/281285 and US 2014/078587 are expressly incorporated by reference in its entirety.

Figure 8A:
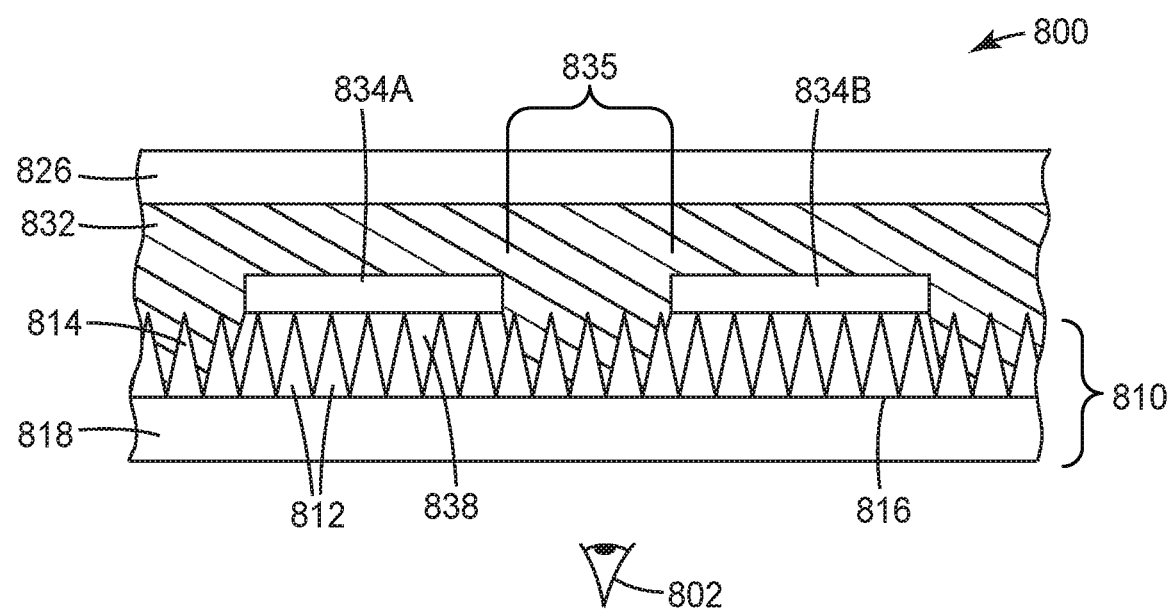
FIGS. 8A and 8B illustrate cross-sectional views of security features formed on a retroreflective sheet, in accordance with one or more techniques of this disclosure.
Figure 8B:
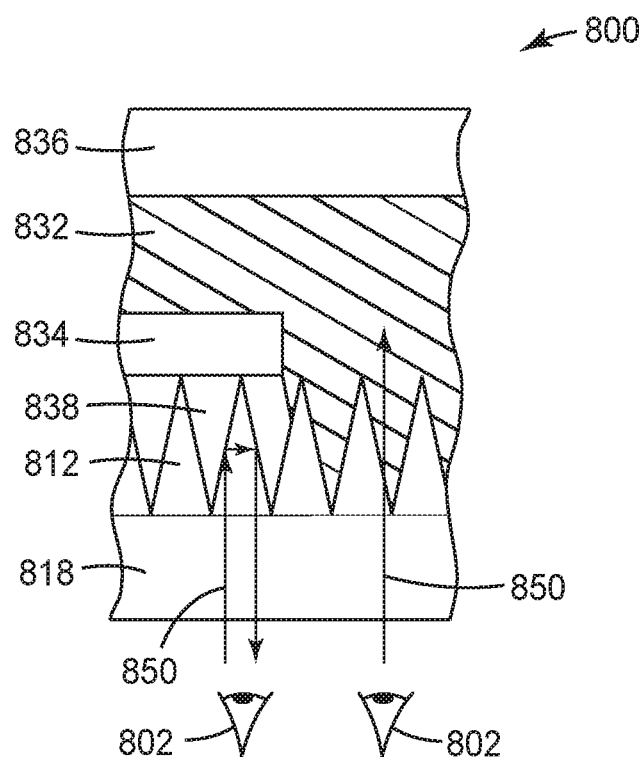

FIGS. 8A and 8B illustrate cross-sectional views of security elements formed on a retroreflective sheet, in accordance with one or more techniques of this disclosure. Retroreflective article 800 includes a retroreflective layer 810 including multiple cube corner elements 812 that collectively form a structured surface 814 opposite a major surface 816. The optical elements can be full cubes, truncated cubes, or preferred geometry (PG) cubes as described in, for example, U.S. Pat. No. 7,422,334, incorporated herein by reference in its entirety. The specific retroreflective layer 810 shown in FIGS. 8A and 8B includes a body layer 818, but those of skill will appreciate that some examples do not include an overlay layer. One or more barrier layers 834 are positioned between retroreflective layer 810 and conforming layer 832, creating a low refractive index area 838. Barrier layers 834 form a physical "barrier" between cube corner elements 812 and conforming layer 832. Barrier layer 834 can directly contact or be spaced apart from or can push slightly into the tips of cube corner elements 812. Barrier layers 834 have a characteristic that varies from a characteristic in one of (1) the areas 832 not including barrier layers (view line 850) or (2) another barrier layer 832. Exemplary characteristics include, for example, color and infrared absorbency.

In general, any material that prevents the conforming layer material from contacting cube corner elements 812 or flowing or creeping into low refractive index area 838 can be used to form the barrier layer Exemplary materials for use in barrier layer 834 include resins, polymeric materials, dyes, inks (including color-shifting inks), vinyl, inorganic materials, UV-curable polymers, multi-layer optical films (including, for example, color-shifting multi-layer optical films), pigments, particles, and beads. The size and spacing of the one or more barrier layers can be varied. In some examples, the barrier layers may form a pattern on the retroreflective sheet. In some examples, one may wish to reduce the visibility of the pattern on the sheeting. In general, any desired pattern can be generated by combinations of the described techniques, including, for example, indicia such as letters, words, alphanumerics, symbols, graphics, logos, or pictures. The patterns can also be continuous, discontinuous, monotonic, dotted, serpentine, any smoothly varying function, stripes, varying in the machine direction, the transverse direction, or both; the pattern can form an image, logo, or text, and the pattern can include patterned coatings and/or perforations. The pattern can include, for example, an irregular pattern, a regular pattern, a grid, words, graphics, images lines, and intersecting zones that form cells.

The low refractive index area 838 is positioned between (1) one or both of barrier layer 834 and conforming layer 832 and (2) cube corner elements 812. The low refractive index area 838 facilitates total internal reflection such that light that is incident on cube corner elements 812 adjacent to a low refractive index area 838 is retroreflected. As is shown in FIG. 8B, a light ray 850 incident on a cube corner element 812 that is adjacent to low refractive index layer 838 is retroreflected back to viewer 802. For this reason, an area of retroreflective article 800 that includes low refractive index layer 838 can be referred to as an optically active area. In contrast, an area of retroreflective article 800 that does not include low refractive index layer 838 can be referred to as an optically inactive area because it does not substantially retroreflect incident light. As used herein, the term "optically inactive area" refers to an area that is at least 50% less optically active (e.g., retroreflective) than an optically active area. In some examples, the optically inactive area is at least 40% less optically active, or at least 30% less optically active, or at least 20% less optically active, or at least 10% less optically active, or at least at least 5% less optically active than an optically active area.

Low refractive index layer 838 includes a material that has a refractive index that is less than about 1.30, less than about 1.25, less than about 1.2, less than about 1.15, less than about 1.10, or less than about 1.05. In general, any material that prevents the conforming layer material from contacting cube corner elements 812 or flowing or creeping into low refractive index area 838 can be used as the low refractive index material. In some examples, barrier layer 834 has sufficient structural integrity to prevent conforming layer 832 from flowing into a low refractive index area 838. In such examples, low refractive index area may include, for example, a gas (e.g., air, nitrogen, argon, and the like). In other examples, low refractive index area includes a solid or liquid substance that can flow into or be pressed into or onto cube corner elements 812. Exemplary materials include, for example, ultra-low index coatings (those described in PCT Patent Application No. PCT/US2010/031290), and gels.

The portions of conforming layer 832 that are adjacent to or in contact with cube corner elements 812 form non-optically active (e.g., non-retroreflective) areas or cells. In some examples, conforming layer 832 is optically opaque. In some examples conforming layer 832 has a white color.

In some examples, conforming layer 832 is an adhesive. Exemplary adhesives include those described in PCT Patent Application No. PCT/US2010/031290. Where the conforming layer is an adhesive, the conforming layer may assist in holding the entire retroreflective construction together and/or the viscoelastic nature of barrier layers 834 may prevent wetting of cube tips or surfaces either initially during fabrication of the retroreflective article or over time.

In some examples, conforming layer 832 is a pressure sensitive adhesive. The PSTC (pressure sensitive tape council) definition of a pressure sensitive adhesive is an adhesive that is permanently tacky at room temperature which adheres to a variety of surfaces with light pressure (finger pressure) with no phase change (liquid to solid). While most adhesives (e.g., hot melt adhesives) require both heat and pressure to conform, pressure sensitive adhesives typically only require pressure to conform. Exemplary pressure sensitive adhesives include those described in U.S. Pat. No. 6,677,030. Barrier layers 834 may also prevent the pressure sensitive adhesive from wetting out the cube corner sheeting. In other examples, conforming layer 832 is a hot-melt adhesive.

In the example of FIG. 8A, a non-barrier region 835 does not include a barrier layer, such as barrier layer 834. As such, light may reflect with a lower intensity than barrier layers 834A-834B. In some examples, non-barrier region 835 may correspond to an "active" security element as described in FIG. 1. For instance, the entire region or substantially all of image region 142A may be a non-barrier region 835. In some examples, substantially all of image region 142A may be a non-barrier region that covers at least 50% of the area of image region 142A. In some examples, substantially all of image region 142A may be a non-barrier region that covers at least 75% of the area of image region 142A. In some examples, substantially all of image region 142A may be a non-barrier region that covers at least 90% of the area of image region 142A. In some examples, a set of barrier layers (e.g., 834A, 834B) may correspond to an "inactive" security element as described in FIG. 1. In the aforementioned example, an "inactive" security element as described in FIG. 1 may have its entire region or substantially all of image region 142D filled with barrier layers. In some examples, substantially all of image region 142D may be a non-barrier region that covers at least 75% of the area of image region 142D. In some examples, substantially all of image region 142D may be a non-barrier region that covers at least 90% of the area of image region 142D. In the foregoing description of FIG. 8 with respect to security layers, in some examples, non-barrier region 835 may correspond to an "inactive" security element while an "active" security element may have its entire region or substantially all of image region 142D filled with barrier layers.

Figure 9:
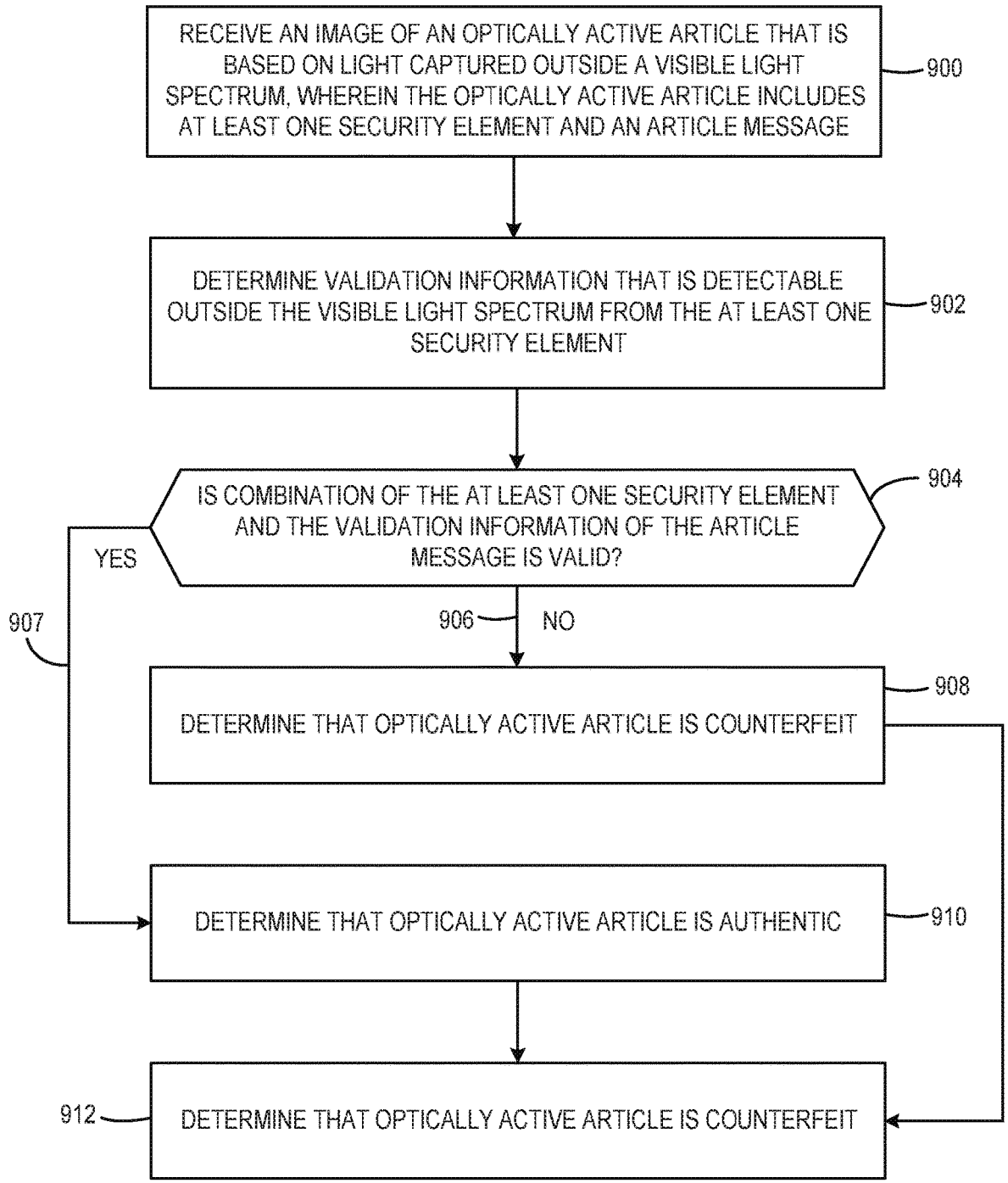
FIG. 9 is a flow diagram illustrating example operations of a computing device configured to detect counterfeit optically active articles in accordance with one or more techniques of this disclosure.

FIG. 9 is a flow diagram illustrating example operations of a computing device configured to detect counterfeit optically active articles in accordance with one or more techniques of this disclosure. For purposes of illustration only, the example operations are described below within the context of computing device 116 of FIGS. 1 and 2. As shown in FIG. 1, computing device 116 may receive, from image capture device 102, an image of an optically active article 108 that is based on light captured outside a visible light spectrum (900). Optically active article 108 may include at least one security element (e.g., 132A) and an article message 126.

In response to receiving the image, computing device 116 may determine validation information that is detectable outside the visible light spectrum from the at least one security element (902). For instance, computing device 116 may determine as validation information, which security elements are active or inactive. Computing device 116 may determine whether a combination of the at least one security element and the validation information of the article message is valid (904). If the combination of the at least one security element and the validation information of the article message is not valid (906), then computing device 116 may determine that the optically active article is counterfeit (908). If the combination of the at least one security element and the validation information of the article message is valid (907), then computing device 116 may determine that the optically active article is authentic (910). Based on determining whether the optically active article is counterfeit or authentic, computing device 116 may perform one or more operations (912). For instance, computing device 116 may generate a notification or report data that the optically active article is counterfeit or authentic.

Techniques of this disclosure may include creating secure optically active articles. In particular, the techniques may include an article which has been modified to include embedded markers (e.g., security elements), a set of logic determining pairings of sheeting markers and plate messages, and a digital printer capable of printing onto license plate sheeting. To authenticate plates the techniques may use a camera capable of capturing images exposing the embedded markings of the sheeting as well as the contents of the plate message. An encoding scheme may be used to determine the validity of the marking/message match.

In some examples, the embedded security elements can be visible in retroreflective or IR light and is not substantially visible in ambient light (e.g., less than 20% visible), such as for retroreflective sheeting containing cube corners. Such examples are described in U.S. Provisional Patent Application 62/264,763, filed on Dec. 8, 2015 and U.S. Publication 2014/0368902, which are hereby incorporated by reference in their entirety. In some examples, the embedded security information or elements can be visible in both retro-reflective light and ambient light, such as those described in U.S. Publication 2014/0368902 for retro-reflective sheeting containing cube corners, and those described in U.S. Pat. Nos. 4,688,894 and 6,288,842 for beaded retro-reflective sheeting, each of which are hereby expressly incorporated by reference in their entirety.

In the above examples, the image taken by a near IR camera (in the range 700 nm-960 nm) may be sufficient to extract both security information and message data. In some examples, the embedded security information is visible in ambient light and disappears in retroreflective light, such as those described in U.S. Patent Publication 2014/0368902 and US Publication 2015/0043074, which are each hereby expressly incorporated by reference in their entireties. In these examples, the visible image may be analyzed by security component 120 side-by-side with the IR image. In some examples, the embedded security information or elements can be customized to contain information unique to a region, a time, or a process. In some examples, the embedded security information or elements can be personalized to contain information unique to the license plate, signage, and security document product itself.

Figure 10:
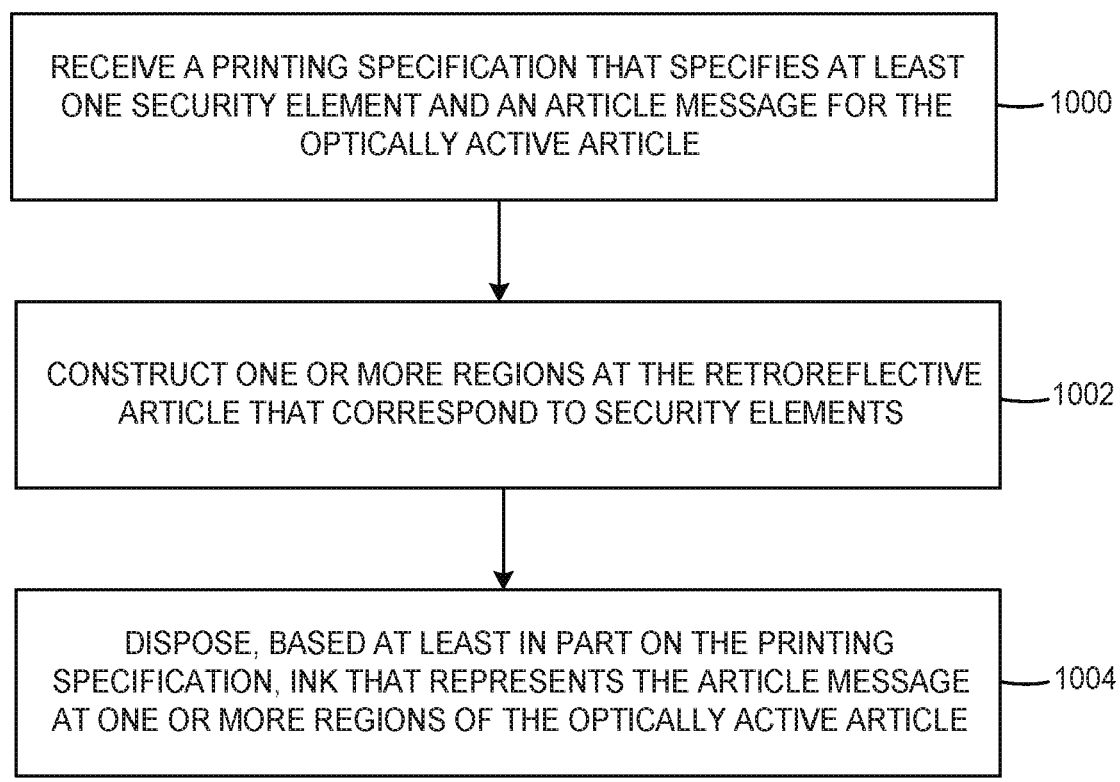
FIG. 10 is a flow diagram illustrating example operations of a computing device configured to construct an optically active article with at least one security element, in accordance with one or more techniques of this disclosure.

FIG. 10 is a flow diagram illustrating example operations of a computing device configured to construct an optically active article with at least one security element, in accordance with one or more techniques of this disclosure. For purposes of illustration only, the example operations are described below within the context of construction device 138. As shown in FIG. 1, construction device 138 may receive a printing specification that specifies at least one security element and an article message for the optically active article (1000). The at least one security element may comprise validation information that is detectable outside a visible light spectrum. In some examples, a combination of the article message and the validation information of the at least one security element indicates whether the optically active article is counterfeit. In the example of FIG. 10, construction device 138 may dispose, based at least in part on the printing specification, a barrier material to one or more regions of the retroreflective article without disposing the barrier material at a region that corresponds to the at least one security element (1002). In the example of FIG. 1, construction device 138 may dispose, based at least in part on the printing specification, ink that represents the article message at one or more regions of the optically active article.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

What is claimed is:

1. A method comprising:
receiving, by a computing device and from an image capture device, an image of an optically active article that is based on light captured under a particular lighting condition, wherein the optically active article includes at least one security element and an article message;
in response to receiving the image, determining, by the computing device, validation information that is detectable under the particular lighting condition from the at least one security element;
determining, by the computing device, whether the optically active article is counterfeit based at least in part on whether a combination of the article message, and the validation information of the at least one security element is valid; and
performing, by the computing device and based at least in part on whether the optically active article is counterfeit, one or more operations, wherein the validation information corresponds to a result generated by applying a function to the article message.

2. The method of claim 1,
wherein the at least one security element is included in a plurality of security elements, and
wherein each of the plurality of security elements is disposed at a different respective location of the optically active article.

3. The method of claim 2, wherein each of the plurality of security elements being disposed at a different respective location of the optically active article comprises each of the plurality of security elements being disposed in an array at the optically active article.

4. The method of claim 1,
wherein the optically active article comprises a plurality of security elements disposed at a different respective locations of the optically active article,
wherein a first security element that reflects the light above a threshold light intensity is active and a second security element which does not reflect the light above the threshold light intensity is inactive, and
wherein determining the validation information that is detectable outside the visible light spectrum from the at least one security element is based at least in part on the first security element being active or the second security element being inactive.

5. The method of claim 1,
wherein the optically active article comprises a plurality of security elements disposed at a different respective locations of the optically active article,
wherein a first security element that reflects the light above a threshold light intensity is inactive and a second security element which does not reflect the light above the threshold light intensity is active, and
wherein determining the validation information that is detectable outside the visible light spectrum from the at least one security element is based at least in part on the first security element being active or the second security element being inactive.

6. The method of claim 1, wherein determining the validation information that is detectable outside the visible light spectrum from the at least one security element further comprises:
determining one or more predefined image regions that correspond to security elements for the optically active article;
inspecting one or more of the predefined image regions within the image of the optically active article; and
determining, based at least in part on one or more pixel values in the predefined image regions, one or more values that represent the validation information.

7. The method of claim 6, wherein determining, based at least in part on one or more pixel values in the predefined image regions, one or more values that represent the validation information further comprises determining one or more values that represent the validation information based at least in part one whether the one or more predefined image regions of security elements are active or inactive.

8. The method of claim 1, wherein determining the validation information that is detectable outside the visible light spectrum from the at least one security element further comprises determining the validation information based at least in part on at least one of a location, shape, size, pattern, composition of the at least one security element.

9. The method of claim 1, wherein performing the one or more operations further comprises:
   determining that the optically active article is counterfeit; and
   generating at least one of a notification or a reporting entry that indicates the optically active article is counterfeit.

10. The method of claim 1, wherein determining whether the optically active article is counterfeit, further comprises:
    determining, by the computing device, whether the validation information satisfies one or more rules of a validation configuration that was used to generate the construct the optically active article with the article message and the at least one security element, wherein the one or more rules of the validation configuration define a valid association between the article message and the validation information of the one or more security elements.

11. The method of claim 1, wherein the at least one security feature is not embedded within any of the set of one or more symbols.

12. The method of claim 1, further comprising:
    determining that a particular image region of the image represents one or more symbols of the article message; and
    wherein determining whether the optically active article is counterfeit comprises determining whether a combination of the one or more symbols of the article message and the validation information represent a valid association.

13. The method of claim 1, wherein the article message includes at least one encoding region, and wherein the computing device determines whether the optically active article is counterfeit based at least in part on the at least one encoding region.

14. The method of claim 1, wherein the function is a one-way function.

15. The method of claim 1, wherein the function is a mapping function.

16. The method of claim 1, wherein the function takes the validation information as an input and produces a value as an output used to verify whether the combination of the article message and security elements indicates an optically active article is authentic or counterfeit.

17. A method comprising:
    receiving, by a computing device and from an image capture device, an image of an optically active article that is based on light captured under a particular lighting condition, wherein the optically active article includes at least one security element and an article message;
    in response to receiving the image, determining, by the computing device, validation information that is detectable under the particular lighting condition from the at least one security element;
    determining, by the computing device, whether the optically active article is counterfeit based at least in part on whether a combination of the article message and the validation information of the at least one security element is valid; and
    performing, by the computing device and based at least in part on whether the optically active article is counterfeit, one or more operations,
    wherein the optically active article comprises a plurality of security elements disposed at a different respective locations of the optically active article, and at least one security element is disposed at a location selected from the group consisting of a location on the optically active article below the article message and a location on the optically active article beside the article message,
    wherein a first security element that reflects the light above a threshold light intensity is active and a second security element which does not reflect the light above the threshold light intensity is inactive, and
    wherein determining the validation information that is detectable outside the visible light spectrum from the at least one security element is based at least in part on the first security element being active or the second security element being inactive.

18. A method comprising:
    receiving, by a computing device and from an image capture device, an image of an optically active article that is based on light captured under a particular lighting condition, wherein the optically active article includes at least one security element and an article message;
    in response to receiving the image, determining, by the computing device, validation information that is detectable under the particular lighting condition from the at least one security element;
    determining, by the computing device, whether the optically active article is counterfeit based at least in part on whether a combination of the article message and the validation information of the at least one security element is valid; and
    performing, by the computing device and based at least in part on whether the optically active article is counterfeit, one or more operations;
    wherein the optically active article comprises a plurality of security elements disposed at a different respective locations of the optically active article, and at least one security element is disposed at a location selected from the group consisting of a location on the optically active article below the article message and a location on the optically active article beside the article message,
    wherein a first security element that reflects the light above a threshold light intensity is inactive and a second security element which does not reflect the light above the threshold light intensity is active, and
    wherein determining the validation information that is detectable outside the visible light spectrum from the at least one security element is based at least in part on the first security element being active or the second security element being inactive.

* * * * *

UNITED STATES PATENT AND TRADEMARK OFFICE
CERTIFICATE OF CORRECTION

PATENT NO. : 11,132,554 B2
APPLICATION NO. : 16/097652
DATED : September 28, 2021
INVENTOR(S) : Justin Johnson It is certified that error appears in the above-identified patent and that said Letters Patent is hereby corrected as shown below:

In the Claims

Column 32
Line 44, In Claim 5, delete "active" and insert -- inactive --, therefor.
Line 45, In Claim 5, delete "inactive" and insert -- active --, therefor.

Column 33
Line 15, In Claim 10, delete "the" and insert -- and --, therefor.
Line 23, In Claim 11, delete "feature" and insert -- element --, therefor.
Line 46, In Claim 16, delete "an" and insert -- the --, therefor.

Column 34
Line 58, In Claim 18, delete "active" and insert -- inactive --, therefor.
Line 59, In Claim 18, delete "inactive" and insert -- active --, therefor.

Signed and Sealed this
Second Day of August, 2022

Katherine Kelly Vidal
*Director of the United States Patent and Trademark Office*